(12) United States Patent
Xia

(10) Patent No.: US 11,330,616 B2
(45) Date of Patent: May 10, 2022

(54) SCHEDULING METHOD, DATA TRANSMISSION METHOD, AND APPARATUS

(71) Applicant: Huawei Technologies Co., Ltd., Shenzhen (CN)

(72) Inventor: Jinhuan Xia, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 92 days.

(21) Appl. No.: 16/828,617

(22) Filed: Mar. 24, 2020

(65) Prior Publication Data

US 2020/0229225 A1    Jul. 16, 2020

Related U.S. Application Data

(63) Continuation of application No. 16/029,022, filed on Jul. 6, 2018, now Pat. No. 10,631,326, which is a
(Continued)

(51) Int. Cl.
*H04W 72/12* (2009.01)
*H04W 72/04* (2009.01)
(Continued)

(52) U.S. Cl.
CPC ....... *H04W 72/1289* (2013.01); *H04W 48/12* (2013.01); *H04W 72/04* (2013.01);
(Continued)

(58) Field of Classification Search
CPC ..... H04W 72/12; H04W 72/04; H04W 48/12; H04W 74/08; H04W 72/1289; H04W 72/0446; H04W 74/0833; H04W 72/1268
See application file for complete search history.

(56) References Cited

U.S. PATENT DOCUMENTS

2007/0093262 A1*  4/2007  Li ................... H04J 13/00
                                                   455/552.1
2009/0092085 A1*  4/2009  Ramesh ............. H04L 1/0083
                                                   370/329
(Continued)

FOREIGN PATENT DOCUMENTS

CN     102238732 A    11/2011
CN     102958184 A     3/2013
(Continued)

OTHER PUBLICATIONS

"Pseudo CR 45.820—Narrowband LTE Introduction," 3GPP TSG GERAN #67 Meeting Yinchuan, China, GP-151023, 3rd Generation Partnership Project, Valbonne, France (Aug. 10-14, 2015).
(Continued)

*Primary Examiner* — Chi Ho A Lee
(74) *Attorney, Agent, or Firm* — Leydig, Voit & Mayer, Ltd.

(57) ABSTRACT

Embodiments of the present invention provide a scheduling method, a data transmission method, and an apparatus, and relate to the field of communications technologies, so as to resolve a problem that an existing LTE system does not support a new type of terminal. The scheduling method includes: sending, by a base station, downlink control information DCI to a first-type terminal, where the DCI includes scheduling information used to instruct the first-type terminal to send uplink data by using a first-mode frame format; the first-mode frame format includes at least one uplink subframe, and each uplink subframe includes at least one first-mode frame format symbol; and duration of the first-mode frame format symbol is at least four times of duration of a second-mode frame format symbol, and the second-mode frame format symbol is a single carrier frequency
(Continued)

---

A base station sends downlink control information DCI to a first-type terminal, where the DCI includes scheduling information used to instruct the first-type terminal to send uplink data by using a first-mode frame format — 201

The base station sends DCI to a second-type terminal or a third-type terminal, where the DCI includes scheduling information used to instruct the second-type terminal or the third-type terminal to send uplink data by using a second-mode frame format — 202

A terminal receives the downlink control information DCI sent by the base station, and sends uplink data according to the downlink control information — 203

The terminal sends uplink control information or random access information to the base station — 204 division multiple access SC-FDMA symbol in an LTE system.

20 Claims, 14 Drawing Sheets

Related U.S. Application Data continuation of application No. PCT/CN2016/070517, filed on Jan. 8, 2016.

(51) Int. Cl.
*H04W 48/12* (2009.01)
*H04W 74/00* (2009.01)
*H04W 74/08* (2009.01)

(52) U.S. Cl.
CPC ... *H04W 72/0446* (2013.01); *H04W 72/1268* (2013.01); *H04W 74/006* (2013.01); *H04W 74/0833* (2013.01)

(56) References Cited

U.S. PATENT DOCUMENTS

| | | | |
|---|---|---|---|
| 2011/0051629 A1 | 3/2011 | Chun et al. | |
| 2011/0249633 A1 | 10/2011 | Hong et al. | |
| 2012/0189077 A1 | 7/2012 | Seo et al. | |
| 2013/0208587 A1 | 8/2013 | Bala et al. | |
| 2013/0265942 A1* | 10/2013 | Lu | H04W 24/02 370/328 |
| 2013/0315159 A1* | 11/2013 | Xia | H04W 72/1273 370/329 |
| 2014/0071864 A1 | 3/2014 | Seo et al. | |
| 2014/0133370 A1 | 5/2014 | Chen et al. | |
| 2014/0169312 A1 | 6/2014 | Wang et al. | |
| 2014/0247801 A1* | 9/2014 | Oizumi | H04L 5/14 370/329 |
| 2014/0328227 A1 | 11/2014 | Wang | |
| 2014/0376433 A1 | 12/2014 | Li et al. | |
| 2015/0016312 A1 | 1/2015 | Li et al. | |
| 2015/0085737 A1 | 3/2015 | Han et al. | |
| 2015/0131579 A1* | 5/2015 | Li | H04L 1/0072 370/329 |
| 2015/0180622 A1 | 6/2015 | Yoo et al. | |
| 2015/0181597 A1 | 6/2015 | Malladi et al. | |
| 2015/0189571 A1* | 7/2015 | Futaki | H04W 36/34 370/331 |
| 2016/0081065 A1 | 3/2016 | Shi et al. | |
| 2016/0150490 A1 | 5/2016 | Ouchi et al. | |
| 2016/0255593 A1 | 9/2016 | Blankenship et al. | |
| 2016/0262188 A1* | 9/2016 | Zhang | H04W 74/0808 |
| 2017/0078830 A1 | 3/2017 | Wu et al. | |
| 2017/0093538 A1 | 3/2017 | Yoon et al. | |
| 2017/0142694 A1* | 5/2017 | Yerramalli | H04W 16/14 |
| 2017/0208571 A1 | 7/2017 | Lee et al. | |
| 2018/0198504 A1* | 7/2018 | Li | H04L 5/0048 |
| 2018/0295608 A1 | 10/2018 | Nguyen et al. | |
| 2018/0302915 A1 | 10/2018 | Einhaus et al. | |
| 2018/0337752 A1* | 11/2018 | Choi | H04L 5/0053 |
| 2019/0013912 A1 | 1/2019 | Tomeba et al. | |
| 2019/0387501 A1* | 12/2019 | Park | H04L 5/005 |

FOREIGN PATENT DOCUMENTS

| | | |
|---|---|---|
| CN | 103024905 A | 4/2013 |
| CN | 103929266 A | 7/2014 |
| CN | 104137441 A | 11/2014 |
| CN | 104767594 A | 7/2015 |
| CN | 104956618 A | 9/2015 |
| CN | 105027479 A | 11/2015 |
| CN | 105191450 A | 12/2015 |
| EP | 2509380 A1 | 10/2012 |
| EP | 2681865 A2 | 1/2014 |
| KR | 20120100759 A | 9/2012 |
| WO | 2012118356 A2 | 9/2012 |
| WO | 2014156894 A1 | 10/2014 |
| WO | 2015100136 A1 | 7/2015 |

OTHER PUBLICATIONS

"3rd Generation Partnership Project;Technical Specification Group Radio Access Network;Evolved Universal Terrestrial Radio Access (E-UTRA);Multiplexing and channel coding(Release 13)," 3GPP TS 36.212 V13.0.0, 3rd Generation Partnership Project, Valbonne, France (Dec. 2015).

"3rd Generation Partnership Project;Technical Specification Group Radio Access Network;Evolved Universal Terrestrial Radio Access (E-UTRA);Physical channels and modulation(Release 13)," 3GPP TS 36.211 V13.0.0, 3rd Generation Partnership Project, Valbonne, France (Dec. 2015).

"3rd Generation Partnership Project;Technical Specification Group Radio Access Network;Evolved Universal Terrestrial Radio Access (E-UTRA);LTE physical layer; General description(Release 13)," 3GPP TS 36.201 V13.0.0, 3rd Generation Partnership Project, Valbonne, France (Dec. 2015).

"3rd Generation Partnership Project;Technical Specification Group Radio Access Network;Evolved Universal Terrestrial Radio Access (E-UTRA);Physical layer procedures(Release 13)," 3GPP TS 36.213 V13.0.0,3rd Generation Partnership Project, Valbonne, France (Dec. 2015).

"3rd Generation Partnership Project;Technical Specification Group Radio Access Network;Evolved Universal Terrestrial Radio Access (E-UTRA);User Equipment (UE) radio access capabilities(Release 13)," 3GPP TS 36.306 V13.0.0, 3rd Generation Partnership Project, Valbonne, France (Dec. 2015).

"UL Numerology and Frame Structure Design," 3GPP TSG-RAN WG1#83, Anaheim, USA, R1-157370, 3rd Generation Partnership Project, Valbonne, France (Nov. 15-22, 2015).

Dahlman et al., "4G: LTE/LTE-Advanced for Mobile Broadband, Chapter 9: Physical Transmission Resources" Second Edition, Elsevier Ltd., (2014).

"Way Forward on NB-IoT," 3GPP TSG-RAN WG1#83, Anaheim, USA, R1-157783, 3rd Generation Partnership Project, Valbonne, France (Nov. 15-22, 2015).

"Discussions on uplink design for NB-IoT," 3GPP TSG-RAN WG1#83, Anaheim, USA, R1-156884, 3rd Generation Partnership Project, Valbonne, France (Nov. 15-22, 2015).

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.5.0, total 101 pages, 3rd Generation Partnership Project, Valbonne, France (Jun. 2012).

"3rd Generation Partnership Project; Technical Specification Group Radio Access Network; Evolved Universal Terrestrial Radio Access (E-UTRA); User Equipment (UE) radio transmission and reception (Release 10)," 3GPP TS 36.101 V10.4.0, total 242 pages 3rd Generation Partnership Project, Valbonne, France (Sep. 2011).

\* cited by examiner

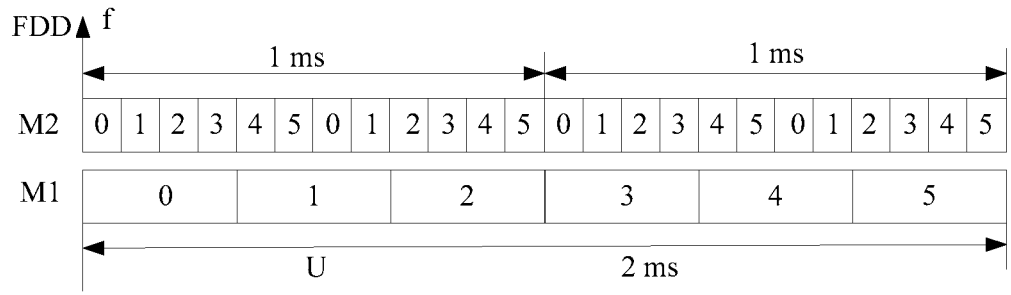

FIG. 7

```
┌─────────────────────────────────────────────────────────────────┐   301
│ A base station sends downlink control information DCI to a      │  ╱
│ first-type terminal, where the DCI includes scheduling          │
│ information used to instruct the first-type terminal to send    │
│ uplink data by using a first-mode frame format                  │
└─────────────────────────────────────────────────────────────────┘
                                  │
                                  ▼
┌─────────────────────────────────────────────────────────────────┐   302
│ The base station sends DCI to a second-type terminal or a       │  ╱
│ third-type terminal, where the DCI includes scheduling          │
│ information used to instruct the second-type terminal or the    │
│ third-type terminal to send uplink data by using a second-      │
│ mode frame format                                               │
└─────────────────────────────────────────────────────────────────┘
                                  │
                                  ▼
┌─────────────────────────────────────────────────────────────────┐   303
│ A terminal receives the downlink control information DCI sent   │  ╱
│ by the base station, and sends uplink data according to the     │
│ downlink control information                                    │
└─────────────────────────────────────────────────────────────────┘
                                  │
                                  ▼
┌─────────────────────────────────────────────────────────────────┐   304
│ The terminal sends uplink control information or random access  │  ╱
│ information to the base station                                 │
└─────────────────────────────────────────────────────────────────┘
```

FIG. 8

SCHEDULING METHOD, DATA TRANSMISSION METHOD, AND APPARATUS

CROSS-REFERENCE TO RELATED APPLICATIONS

This application is a continuation of U.S. patent application Ser. No. 16/029,022, filed on Jul. 6, 2018, which is a continuation of International Application No. PCT/CN2016/070517, filed on Jan. 8, 2016. All of the afore-mentioned patent applications are hereby incorporated by reference in their entireties.

TECHNICAL FIELD

Embodiments of the present invention relates to the field of communications technologies, and in particular, to a scheduling method, a data transmission method, and an apparatus.

BACKGROUND

Currently, in a Long Term Evolution LTE system, user equipment UE detects downlink control information DCI in a downlink subframe. The DCI includes scheduling information used by the UE to send a physical uplink shared channel PUSCH and scheduling information used by the UE to receive a physical downlink shared channel PDSCH, for example, a quantity of physical resource blocks used in a frequency domain, a used modulation and coding scheme or modulation scheme, and a quantity of bits included in a carried transport block. The PUSCH channel mainly carries uplink data sent by a terminal, and is sent by using a format of single carrier frequency division multiple access SC-FDMA. A smallest scheduling granularity in the frequency domain is one physical resource block PRB, one PRB includes 12 orthogonal subcarriers in the frequency domain, and a subcarrier spacing is 15 kHz. Therefore, one PRB includes a 180-kHz frequency resource.

However, with rapid development of communications technologies, a plurality of types of LTE terminals are already available or one type of terminal may have a plurality of capabilities. For example, a first-type terminal can send a single subcarrier with a 3.75-kHz orthogonal subcarrier spacing by means of SC-FDMA in an uplink manner, or send a single sub-channel with a 3.75-kHz sub-channel bandwidth by means of FDMA in an uplink manner; a second-type terminal or a first-type terminal has a capability of sending a single subcarrier with a 15-kHz orthogonal subcarrier spacing by means of SC-FDMA in an uplink manner; and a third-type terminal or a first-type terminal has a capability of sending a plurality of subcarriers with a 15-kHz orthogonal subcarrier spacing by means of SC-FDMA in an uplink manner. The three types of terminals all support an orthogonal frequency division multiple access OFDMA technology in downlink, and a subcarrier spacing is 15 kHz.

However, because a smallest scheduling granularity of the LTE system is one PRB, and granularity scheduling of a single subcarrier or a plurality of subcarriers is not supported, none of the three types of terminals can be supported in the existing LTE system. For example, if the first-type terminal sends a signal over a 3.75-kHz single subcarrier or sub-channel, a length of the signal in a time domain is at least four times of a length of a signal sent over a 15-kHz single subcarrier. A frame structure in the LTE system is designed according to a 15-kHz subcarrier spacing. Therefore, the first-type terminal is not supported. Therefore, a scheduling method, a data transmission method, and an apparatus are urgently required.

SUMMARY

Embodiments of the present invention provide a scheduling method, a data processing method, and an apparatus, to resolve a problem that an existing LTE system does not support three new types of terminals.

To achieve the foregoing objective, the following technical solutions are used in the embodiments of the present invention.

According to a first aspect, a scheduling method is provided, and is applied to a communications system, where the method includes:

sending, by a base station, downlink control information DCI to a first-type terminal, where the DCI includes scheduling information used to instruct the first-type terminal to send uplink data by using a first-mode frame format, where the first-mode frame format includes at least one uplink subframe, and each uplink subframe includes at least one first-mode frame format symbol; and duration of the first-mode frame format symbol is at least four times of duration of a second-mode frame format symbol, and the second-mode frame format symbol is a single carrier frequency division multiple access SC-FDMA symbol in an LTE system.

When an uplink configuration of the LTE system is a normal cyclic prefix CP, each uplink subframe has 1-millisecond duration and includes 14 SC-FDMA symbols. Therefore, each SC-FDMA symbol in the LTE system includes a normal cyclic prefix and has average $\frac{1}{14}$-millisecond duration. It should be noted that duration of the SC-FDMA symbols included in each uplink subframe in the LTE system may be different. For example, among the 14 SC-FDMA symbols included in each uplink subframe, there are two long SC-FDMA symbols, and duration of each long SC-FDMA symbol is 71.88 microseconds; and there are 12 short SC-FDMA symbols, and duration of each short SC-FDMA symbol is 71.35 microseconds. When an uplink configuration of the LTE system is an extended cyclic prefix CP, each uplink subframe has 1-millisecond duration and includes 12 SC-FDMA symbols that have same duration. Therefore, each SC-FDMA symbol in the LTE system includes an extended cyclic prefix and has $\frac{1}{12}$-millisecond duration.

When an SC-FDMA symbol in the LTE system does not include a CP, duration of each symbol is 66.7 microseconds.

The uplink data is carried on a physical uplink shared channel PUSCH, or carried on a physical channel that is used to send the uplink data and that is defined for the first-type terminal.

With reference to the first aspect, in a first possible implementation of the first aspect, the method further includes:

sending, by the base station, downlink control information DCI to a second-type terminal or a third-type terminal, where the DCI includes scheduling information used to instruct the second-type terminal or the third-type terminal to send uplink data by using a second-mode frame format, where the second-mode frame format includes a frame structure type 1 applicable to an FDD system and a frame structure type 2 applicable to a TDD system, each radio frame in the second-mode frame format includes 10 subframes, a length of each subframe is 1 millisecond, and a spacing between subcarriers in physical resource information corresponding to the second-mode frame format is 15 kHz.

For example, the downlink control information DCI includes scheduling information used to instruct a terminal to send uplink data, and includes at least one of a quantity of subcarriers used in a frequency domain, a used modulation and coding scheme or modulation scheme, or a quantity of bits included in a carried transport block.

It should be noted that, when single carrier frequency division multiple access SC-FDMA is used in uplink, the first-mode frame format symbol may be an SC-FDMA symbol; or when FDMA frequency division multiple access is used in uplink, the first-mode frame format symbol may be an FDMA symbol. This is not specifically limited in this embodiment of the present invention. In addition, the first-mode frame format symbol may be a symbol with a cyclic prefix CP added, or may be a symbol without a CP added. The second-mode frame format symbol may be a symbol with a cyclic prefix CP added, or may be a symbol without a CP added.

The communications system may be a frequency division duplex (Frequency Division Duplex, FDD) system, or may be a time division duplex (Time Division Duplex, TDD) system. Therefore, the second-mode frame format includes the frame structure type 1 applicable to the FDD system and the frame structure type 2 applicable to the TDD system. In addition, first-mode frame formats vary between the FDD communications system and the TDD communications system.

The frame structure type 1 applicable to the FDD system and included in the second-mode frame format is shown in FIG. 3. A time length of a radio frame in the frame structure type 1 is 10 milliseconds. A radio frame includes 20 timeslots, each timeslot is 0.5 millisecond, and two timeslots form a subframe. That is, the frame structure type 1 includes 10 subframes, and a length of each subframe is 1 millisecond. In addition, when a normal CP is used, each subframe includes 14 OFDM symbols or SC-FDMA symbols; or when an extended CP is used, each subframe includes 12 OFDM symbols or SC-FDMA symbols.

The frame structure type 2 applicable to the TDD system and included in the second-mode frame format is shown in FIG. 9. The second-mode frame format includes a 10-millisecond radio frame that includes two 5-millisecond half-frames. Each half-frame includes five 1-millisecond subframes, and includes a downlink subframe, a special subframe, and an uplink subframe. The special subframe includes a downlink pilot timeslot DwPTS, an uplink pilot timeslot UpPTS, and a guard period GP. When a 5-millisecond period is used for a downlink-to-uplink switch point, the special subframe exists in both half-frames. When a 10-millisecond period is used for a downlink-to-uplink switch point, the special subframe exists in only a first half-frame. In addition, when a normal CP is used, each subframe includes 14 OFDM symbols or SC-FDMA symbols; or when an extended CP is used, each subframe includes 12 OFDM symbols or SC-FDMA symbols.

With reference to the first aspect or the first possible implementation of the first aspect, in a second possible implementation of the first aspect, when the terminal is the first-type terminal, the scheduling information includes physical resource information used when the uplink data is sent by using the first-mode frame format, the physical resource information includes a time resource and a frequency resource, the time resource includes at least one uplink subframe, and the frequency resource includes one subcarrier; or when the terminal is the second-type terminal or the third-type terminal, the scheduling information includes physical resource information used when the uplink data is sent by using the second-mode frame format, the physical resource information includes a time resource and a frequency resource, the time resource includes at least one uplink subframe, and the frequency resource includes one or more subcarriers (12 subcarriers at maximum). Specifically, when the terminal is the second-type terminal, the frequency resource includes one subcarrier. When the terminal is the second-type terminal, the frequency resource includes one or more subcarriers (12 subcarriers at maximum).

According to a second aspect, a data transmission method is provided, where the method includes:

sending, by a terminal, uplink control information or random access information to a base station, where the terminal is a first-type terminal, and a frame format used to send the uplink control information or the random access information is a first-mode frame format, where the first-mode frame format includes at least one uplink subframe, and each uplink subframe includes at least one first-mode frame format symbol; and duration of the first-mode frame format symbol is at least four times of duration of a second-mode frame format symbol, and the second-mode frame format symbol is a single carrier frequency division multiple access SC-FDMA symbol in an LTE system.

The uplink control information UCI includes an ACK or a NACK, so as to confirm whether the terminal correctly receives downlink data carried on a downlink shared channel PDSCH; or includes channel state information CSI used to reflect downlink channel quality. The uplink control information is carried on a physical uplink control channel PUCCH, or carried on a physical channel that is used to send the uplink control information and that is defined for the first-type terminal. The random access information includes a random access preamble, and is carried on a physical random access channel PRACH, or carried on a physical channel that is used to send uplink random access information and that is defined for the first-type terminal.

Optionally, the first-mode frame format is preset. For example, the first-mode frame format is correspondingly used at one or several specified carrier frequencies used in a system, or the first-mode frame format is correspondingly used for a specified downlink synchronization signal sequence or a specified format for sending a downlink synchronization signal, that is, at a specific time and/or frequency resource mapping location, or the first-mode frame format is correspondingly used for a format that is used for sending downlink system information and that is included or specified in the downlink system information, that is, at a specific time and/or frequency resource mapping location. The terminal may directly send the uplink control information or the random access information that uses a first frame format to the base station after learning, according to the specified correspondence or indication information in the downlink system information, that the first-mode frame format is used.

With reference to the second aspect, in a first possible implementation of the second aspect, when the terminal sends the uplink control information to the base station, before the sending, by a terminal, uplink control information to a base station, the method further includes:

receiving, by the terminal, downlink control information DCI sent by the base station, where the DCI includes scheduling information used to instruct the first-type terminal to send uplink data by using the first-mode frame format.

With reference to the second aspect, in a second possible implementation of the second aspect, when the terminal is a second-type terminal or a third-type terminal, a frame format used to send the uplink control information or the random access information is a second-mode frame format, where the second-mode frame format includes a frame structure type 1 applicable to an FDD system and a frame structure type 2 applicable to a TDD system, the second-mode frame format includes 10 subframes, a length of each subframe is 1 millisecond, and a spacing between subcarriers in physical resource information corresponding to the second-mode frame format is 15 kHz.

With reference to the second possible implementation of the second aspect, in a third possible implementation of the second aspect, when the terminal sends the uplink control information to the base station, before the sending, by a terminal, uplink control information to a base station, the method further includes:

receiving, by the terminal, downlink control information DCI sent by the base station, where the DCI includes scheduling information used to instruct the second-type terminal or the third-type terminal to send uplink data by using the second-mode frame format.

With reference to any one of the second aspect, or the first to the third possible implementations of the second aspect, in a fourth possible implementation of the second aspect, when the terminal is the first-type terminal, the scheduling information includes physical resource information used when the uplink data is sent by using the first-mode frame format, the physical resource information includes a time resource and a frequency resource, the time resource includes at least one uplink subframe, and the frequency resource includes one subcarrier; or when the terminal is the second-type terminal or the third-type terminal, the scheduling information includes physical resource information used when the uplink data is sent by using the second-mode frame format, the physical resource information includes a time resource and a frequency resource, the time resource includes at least one uplink subframe, and the frequency resource includes one or more subcarriers (12 subcarriers at maximum). Specifically, when the terminal is the second-type terminal, the frequency resource includes one subcarrier. When the terminal is the second-type terminal, the frequency resource includes one or more subcarriers (12 subcarriers at maximum).

With reference to the first aspect or the second aspect, when the communications system is a frequency division duplex FDD system, and uses a normal cyclic prefix CP in uplink, if duration of the uplink subframe is 1 millisecond, the uplink subframe includes three first-mode frame format symbols, and duration of the three first-mode frame format symbols is equal to duration of 12 second-mode frame format symbols and less than 1 millisecond, where duration of the second-mode frame format symbol is duration of each SC-FDMA symbol that includes a normal cyclic prefix.

Optionally, when the communications system is an FDD system, and uses an extended CP in uplink, if duration of the uplink subframe is 1 millisecond, the uplink subframe includes three first-mode frame format symbols, and duration of the three first-mode frame format symbols is equal to duration of 12 second-mode frame format symbols and equal to 1 millisecond, where duration of the second-mode frame format symbol is duration of each SC-FDMA symbol that includes an extended cyclic prefix.

Optionally, when the communications system is an FDD system, a time length of the first-mode frame format is N*10 milliseconds, where N is 1 or is an even number greater than 0, and the uplink subframe in the first-mode frame format is M milliseconds, where M is an even number greater than 0, and M<=N*10; and when duration of the uplink subframe in the first-mode frame format is 2 milliseconds, and the communications system uses a normal CP in uplink, the uplink subframe includes seven first-mode frame format symbols, and duration of the seven first-mode frame format symbols is equal to duration of 28 second-mode frame format symbols and equal to 2 milliseconds, where duration of the second-mode frame format symbol is duration of each SC-FDMA symbol that includes a normal cyclic prefix; or when duration of the uplink subframe in the first-mode frame format is 2 milliseconds, and the communications system uses an extended CP in uplink, the uplink subframe includes six first-mode frame format symbols, and duration of the six first-mode frame format symbols is equal to duration of 24 second-mode frame format symbols and equal to 2 milliseconds, where duration of the second-mode frame format symbol is duration of each SC-FDMA symbol that includes an extended cyclic prefix.

Optionally, when the communications system is a time division duplex TDD system, the first-mode frame format further includes at least one special subframe and at least one downlink subframe, and the special subframe includes at least one of a downlink pilot timeslot DwPTS, an uplink pilot timeslot UpPTS, or a guard period GP.

Optionally, when the communications system is the TDD system, each uplink subframe includes at least one first-mode frame format symbol, and a time length of each special subframe is 1 millisecond; and when the communications system uses a normal CP in uplink, and duration of the uplink subframe is 1 millisecond, the uplink subframe includes three first-mode frame format symbols, and duration of the three first-mode frame format symbols is equal to duration of 12 second-mode frame format symbols and less than 1 millisecond, where duration of the second-mode frame format symbol is duration of each SC-FDMA symbol that includes a normal cyclic prefix; or when the communications system uses an extended CP in uplink, and duration of the uplink subframe is 1 millisecond, the uplink subframe includes three first-mode frame format symbols, and duration of the three first-mode frame format symbols is equal to duration of 12 second-mode frame format symbols and equal to 1 millisecond, where duration of the second-mode frame format symbol is duration of each SC-FDMA symbol that includes an extended cyclic prefix.

Optionally, when the communications system is the TDD system, a 5-millisecond period is used for a downlink-to-uplink switch point in the first-mode frame format, where one downlink subframe, one special subframe, and at least one uplink subframe are included within a 5-millisecond time length, each uplink subframe includes at least one first-mode frame format symbol, and a time length of each special subframe is 1 millisecond; and when the communications system uses a normal CP in uplink, and duration of the uplink subframe is 2 milliseconds, the uplink subframe includes seven first-mode frame format symbols, and duration of the seven first-mode frame format symbols is equal to duration of 28 second-mode frame format symbols and equal to 2 milliseconds, where duration of the second-mode frame format symbol is duration of each SC-FDMA symbol that includes a normal cyclic prefix; or when the communications system uses an extended CP in uplink, and duration of the uplink subframe is 2 milliseconds, the uplink subframe includes six first-mode frame format symbols, and duration of the six first-mode frame format symbols is equal to duration of 24 second-mode frame format symbols and equal to 2 milliseconds, where duration of the second-mode frame format symbol is duration of each SC-FDMA symbol that includes an extended cyclic prefix.

Optionally, when the communications system is the TDD system, a 5-millisecond period is used for a downlink-to-uplink switch point in the first-mode frame format, where one downlink subframe, one special subframe, and at least one uplink subframe are included within a 5-millisecond time length, each uplink subframe includes at least one first-mode frame format symbol, and a time length of each special subframe is 1 millisecond; and when the communications system uses a normal CP in uplink, and duration of the uplink subframe is 3 milliseconds, the uplink subframe includes 10 first-mode frame format symbols, and duration of the 10 first-mode frame format symbols is equal to duration of 40 second-mode frame format symbols and less than 3 milliseconds, where duration of the second-mode frame format symbol is duration of each SC-FDMA symbol that includes a normal cyclic prefix; or when the communications system uses an extended CP in uplink, and duration of the uplink subframe is 3 milliseconds, the uplink subframe includes nine first-mode frame format symbols, and duration of the nine first-mode frame format symbols is equal to duration of 36 second-mode frame format symbol and equal to 3 milliseconds, where duration of the second-mode frame format symbol is duration of each SC-FDMA symbol that includes an extended cyclic prefix.

Further, when the communications system is the TDD system, a 5-millisecond period is used for a downlink-to-uplink switch point in the first-mode frame format, where one downlink subframe, one special subframe, and at least one uplink subframe are included within a 5-millisecond time length, and each uplink subframe includes at least one first-mode frame format symbol. In first-mode frame formats shown in FIG. 18 and FIG. 19, each special subframe includes at least one of a DwPTS or a GP, a length of the DwPTS or the GP is the same as that of a DwPTS or a GP in a special subframe in the frame structure type 2 in the LTE system, and varies with configurations of the special subframe, and a total time length of the DwPTS and the GP is less than 1 millisecond.

Specifically, when the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

Optionally, when the communications system uses a normal CP in uplink, and the DwPTS and the GP that are included in the special subframe meet a configuration 5, 6, 7, 8, or 9 of the special subframe in Table 2, if duration of an uplink subframe is (T1+3) milliseconds, the uplink subframe includes 11 first-mode frame format symbols, and duration of the 11 first-mode frame format symbols is equal to duration of 44 second-mode frame format symbols and equal to (T1+3) milliseconds, where T1 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix.

Optionally, when the communications system uses a normal CP in uplink, and the DwPTS and the GP that are included in the special subframe meet a configuration 5, 6, 7, 8, or 9 of the special subframe in Table 2, if duration of an uplink subframe is (T2+1) milliseconds, the uplink subframe includes four first-mode frame format symbols, and duration of the four first-mode frame format symbols is equal to duration of 16 second-mode frame format symbols and equal to (T2+1) milliseconds, where T2 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix.

Further, when the communications system is the TDD system, a 10-millisecond period is used for a downlink-to-uplink switch point in the first-mode frame format, where one downlink subframe, one special subframe, and at least one uplink subframe are included within a time length of the first 5 milliseconds, and only a downlink subframe is included within a time length of the last 5 milliseconds; and duration of each downlink subframe is 1 millisecond. Each uplink subframe includes at least one first-mode frame format symbol. If each special subframe includes at least one of a DwPTS or a GP, and a length of the DwPTS or the GP is the same as that of a DwPTS or a GP in a special subframe in the frame structure type 2 in the LTE system, a total time length of the DwPTS and the GP is less than 1 millisecond.

Specifically, when the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

When the communications system uses a normal CP in uplink, if duration of an uplink subframe within a time length of the first 5 milliseconds is 3 milliseconds, the uplink subframe includes 10 first-mode frame format symbols, and duration of the 10 first-mode frame format symbols is equal to duration of 40 second-mode frame format symbols and less than 3 milliseconds, where duration of a second-mode frame format symbol is duration of each SC-FDMA symbol that includes a normal cyclic prefix. When the DwPTS and the GP that are included in the special subframe meet a configuration 5, 6, 7, 8, or 9 of the special subframe in Table 2, if duration of an uplink subframe within a time length of the first 5 milliseconds is (T1+3) milliseconds, the uplink subframe includes 11 first-mode frame format symbols, and duration of the 11 first-mode frame format symbols is equal to duration of 44 second-mode frame format symbols and equal to (T1+3) milliseconds, where T1 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix. Only a downlink subframe is included within a time length of the last 5 milliseconds, and the downlink subframe is consistent with a downlink subframe in the second-mode frame format. Details are not described in the present invention.

When the communications system uses an extended CP in uplink, if duration of an uplink subframe within a time length of the first 5 milliseconds is 3 milliseconds, the uplink subframe includes nine first-mode frame format symbols, and duration of the nine first-mode frame format symbols is equal to duration of 36 second-mode frame format symbols and equal to 3 milliseconds, where duration of a second-mode frame format symbol is duration of each SC-FDMA symbol that includes an extended cyclic prefix. Only a downlink subframe is included within a time length of the last 5 milliseconds, and the downlink subframe is consistent with a downlink subframe in the second-mode frame format. Details are not described in the present invention.

Optionally, when the communications system uses a normal CP in uplink, and duration of an uplink subframe within a time length of the first 5 milliseconds is 2 milliseconds, the uplink subframe includes seven first-mode frame format symbols, and duration of the seven first-mode frame format symbols is equal to duration of 28 second-mode frame format symbols and less than 2 milliseconds, where duration of a second-mode frame format symbol is duration of each SC-FDMA symbol that includes a normal cyclic prefix. Only a downlink subframe is included within a time length of the last 5 milliseconds, and the downlink subframe is consistent with a downlink subframe in the second-mode frame format. Details are not described in the present invention.

When the communications system uses an extended CP in uplink, and duration of an uplink subframe within a time length of the first 5 milliseconds is 2 milliseconds, the uplink subframe includes six first-mode frame format symbols, and duration of the six first-mode frame format symbols is equal to duration of 24 second-mode frame format symbols and equal to 2 milliseconds, where duration of a second-mode frame format symbol is duration of each SC-FDMA symbol that includes an extended cyclic prefix. Only a downlink subframe is included within a time length of the last 5 milliseconds, and the downlink subframe is consistent with a downlink subframe in the second-mode frame format. Details are not described in the present invention.

Optionally, when the communications system uses a normal CP in uplink, if duration of an uplink subframe within a time length of the first 5 milliseconds is 1 millisecond, the uplink subframe includes three first-mode frame format symbols, and duration of the three first-mode frame format symbols is equal to duration of 12 second-mode frame format symbols and less than 1 millisecond. When the DwPTS and the GP that are included in the special subframe meet a configuration 5, 6, 7, 8, or 9 of the special subframe in Table 2, if duration of an uplink subframe within a time length of the first 5 milliseconds is (T2+1) milliseconds, the uplink subframe includes four first-mode frame format symbols, and duration of the four first-mode frame format symbols is equal to duration of 16 second-mode frame format symbols and equal to (T2+1) milliseconds, where T2 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix. Only a downlink subframe is included within a time length of the last 5 milliseconds, and the downlink subframe is consistent with a downlink subframe in the second-mode frame format. Details are not described in the present invention.

When the communications system uses an extended CP in uplink, if duration of an uplink subframe within a time length of the first 5 milliseconds is 1 millisecond, the uplink subframe includes three first-mode frame format symbols, and duration of the three first-mode frame format symbols is equal to duration of 12 second-mode frame format symbols and equal to 1 millisecond, where duration of a second-mode frame format symbol is duration of each SC-FDMA symbol that includes an extended cyclic prefix. Only a downlink subframe is included within a time length of the last 5 milliseconds, and the downlink subframe is consistent with a downlink subframe in the second-mode frame format. Details are not described in the present invention.

Further, when the communications system is the TDD system, a 5-millisecond period is used for a downlink-to-uplink switch point in the first-mode frame format, and duration of an uplink subframe included within a time length of 5 milliseconds is different from duration of an uplink subframe included within a time length of next 5 milliseconds, where one downlink subframe, one special subframe, and at least one uplink subframe are included within each 5-millisecond time length, each uplink subframe includes at least one first-mode frame format symbol, and a time length of each special subframe is less than or equal to 1 millisecond. When the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

When the communications system uses a normal CP in uplink, if duration of an uplink subframe included within the time length of the 5 milliseconds is 3 milliseconds, the uplink subframe includes 10 first-mode frame format symbols, and duration of the 10 first-mode frame format symbols is equal to duration of 40 second-mode frame format symbols and less than 3 milliseconds, where duration of a second-mode frame format symbol is duration of each SC-FDMA symbol that includes a normal cyclic prefix. When the DwPTS and the GP that are included in the special subframe meet a configuration 5, 6, 7, 8, or 9 of the special subframe in Table 2, if duration of an uplink subframe included within the time length of the 5 milliseconds is (T1+3) milliseconds, the uplink subframe includes 11 first-mode frame format symbols, and duration of the 11 first-mode frame format symbols is equal to duration of 44 second-mode frame format symbols and equal to 3 milliseconds, where duration of a second-mode frame format symbol is duration of each SC-FDMA symbol that includes a normal cyclic prefix. If duration of an uplink subframe included within the time length of the next 5 milliseconds is 2 milliseconds, the uplink subframe includes seven first-mode frame format symbols, and duration of the seven first-mode frame format symbols is equal to duration of 28 second-mode frame format symbols and equal to 2 milliseconds, where duration of a second-mode frame format symbol is duration of each SC-FDMA symbol that includes a normal cyclic prefix.

In addition, when the communications system uses an extended CP in uplink, if duration of an uplink subframe included within the time length of the 5 milliseconds is 3 milliseconds, the uplink subframe includes nine first-mode frame format symbols, and duration of the nine first-mode frame format symbols is equal to duration of 36 second-mode frame format symbols and equal to 3 milliseconds, where duration of a second-mode frame format symbol is duration of each SC-FDMA symbol that includes an extended cyclic prefix. If duration of an uplink subframe included within the time length of the next 5 milliseconds is 2 milliseconds, the uplink subframe includes six first-mode frame format symbols, and duration of the six first-mode frame format symbols is equal to duration of 24 second-mode frame format symbols and equal to 2 milliseconds, where duration of a second-mode frame format symbol is duration of each SC-FDMA symbol that includes an extended cyclic prefix.

Optionally, an uplink demodulation reference signal is sent on the at least one first-mode frame format symbol in the at least one uplink subframe.

Optionally, when the last symbol of first-mode frame format symbols included within a 1-millisecond time length partially or completely overlaps with the last second-mode frame format symbol within the 1-millisecond time length, no uplink signal or channel is sent on the last first-mode frame format symbol within the 1-millisecond time length. When the first-mode frame format symbol is a symbol including a normal CP, the second-mode frame format symbol is an SC-FDMA symbol including the normal CP. When the first-mode frame format symbol is a symbol including an extended CP, the second-mode frame format symbol is an SC-FDMA symbol including the extended CP. When the first-mode frame format symbol is a symbol that does not include a CP, the second-mode frame format symbol is an SC-FDMA symbol that does not include the CP.

Optionally, the second-mode frame format includes the frame structure type 2 applicable to the TDD system, the frame structure type 2 includes one special subframe, a plurality of downlink subframes, and a plurality of uplink subframes, duration of each of the special subframe, each downlink subframe, and each uplink subframe is 1 millisecond, and the special subframe includes a downlink pilot timeslot DwPTS, an uplink pilot timeslot UpPTS, and a guard period GP.

Optionally, when the first-mode frame format includes an UpPTS, and a length of the UpPTS in the first-mode frame format is less than or equal to a length of an UpPTS in the frame structure type 2, no uplink signal or channel is sent in the UpPTS included in the first-mode frame format.

Optionally, when the second-mode frame format includes an unavailable uplink subframe, no uplink signal or channel is sent on a corresponding first-mode frame format symbol within duration of the unavailable uplink subframe in the first-mode frame format. The unavailable uplink subframe is one or more uplink subframes, and duration of each uplink subframe is 1 millisecond. The unavailable uplink subframe means that all or some frequency resources in the unavailable uplink subframe are reserved resources. The reserved resources are used for communication between special terminals, or between a terminal and a base station that are supported by a special communications system, or between terminals that are supported by a special communications system. The reserved resources cannot be used for communication between non-special terminals, or between a terminal and a base station that are supported by a non-special communications system, or between terminals that are supported by a non-special communications system. For example, all or some frequency resources in an unavailable uplink subframe in the LTE system are reserved resources, and are used for communication between devices in such a special system. The reserved resources cannot be used by a common LTE terminal in the unavailable uplink subframe.

The first-type terminal learns of information about the unavailable uplink subframe by receiving system information, including an uplink subframe that is an unavailable uplink subframe, or further including a frequency domain resource in an unavailable uplink subframe that is a reserved resource, or the like.

According to a third aspect, a base station is provided, where the base station includes a processor, a memory, a system bus, and a communications interface.

The memory is configured to store a computer executable instruction, the processor is connected to the memory by using the system bus, and when the base station runs, the processor executes the computer executable instruction stored in the memory, so that the base station executes the scheduling method according to any one of the first aspect, or the first and the second possible implementations of the first aspect.

According to a fourth aspect, a terminal is provided, where the terminal includes a processor, a memory, a system bus, and a communications interface.

The memory is configured to store a computer executable instruction, the processor is connected to the memory by using the system bus, and when the base station runs, the processor executes the computer executable instruction stored in the memory, so that the terminal executes the data transmission method according to any one of the second aspect, or the first to the fourth possible implementations of the second aspect.

According to the scheduling method, the data transmission method, and the apparatus that are provided in the embodiments of the present invention, the base station sends the downlink control information DCI to the first-type terminal. The DCI includes the scheduling information used to instruct the first-type terminal to send the uplink data by using the first-mode frame format, the first-mode frame format includes the at least one uplink subframe, each uplink subframe includes the at least one first-mode frame format symbol, and the duration of the first-mode frame format symbol is at least four times of the duration of the second-mode frame format symbol. The second-mode frame format symbol is the SC-FDMA symbol in the LTE system. The base station sends the downlink control information DCI to the second-type terminal or the third-type terminal. The DCI includes the scheduling information used to instruct the second-type terminal or the third-type terminal to send the uplink data by using the second-mode frame format. In this way, the base station in the LTE system can support an existing LTE terminal, and also support the first-type terminal, the second-type terminal, and the third-type terminal that are newly available in the FDD system and the TDD system. This saves a time resource and a frequency resource, and also improves utilization of the communications system and utilization of the base station.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 7 is a schematic structural diagram of a fourth-type first-mode frame structure according to an embodiment of the present invention;

FIG. 8 is a schematic flowchart of another scheduling method according to an embodiment of the present invention;

DESCRIPTION OF EMBODIMENTS

Figure 1:
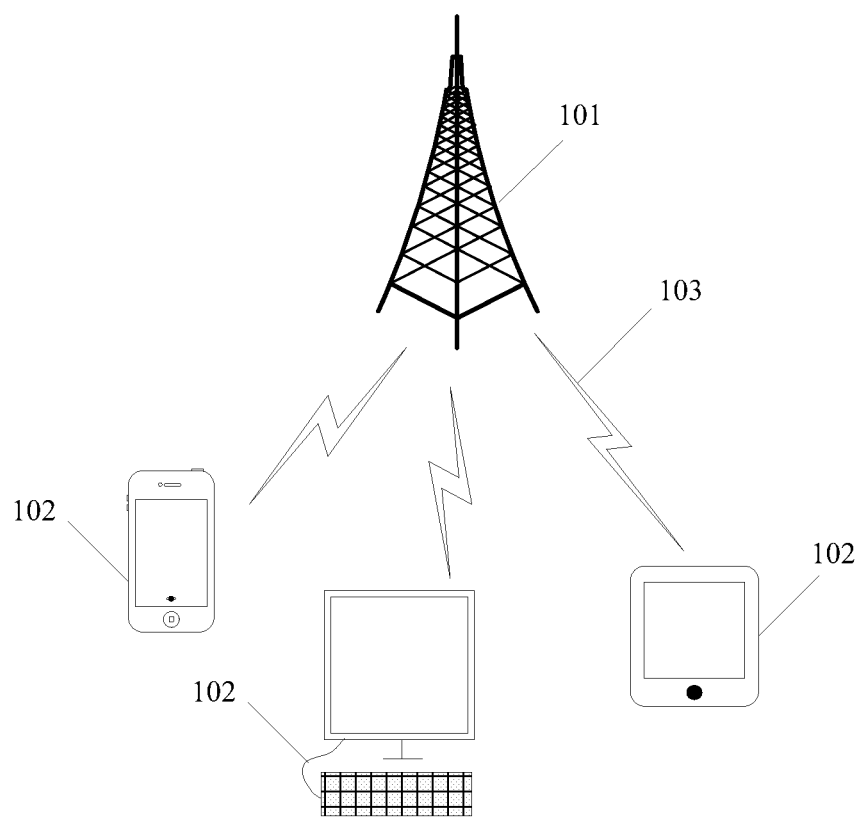
FIG. 1 is a system architecture diagram of a communications system according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

A user terminal type and an application scenario used in embodiments of the present invention are first briefly described before embodiments of the present invention are described.

The user terminal type in the embodiments of the present invention mainly includes an existing LTE terminal and a newly available terminal. The existing LTE terminal can send an orthogonal subcarrier with a 15-kHz subcarrier spacing by means of SC-FDMA in an uplink manner. A smallest scheduling granularity is one PRB that includes 12 orthogonal subcarriers, that is, 180 kHz. Granularity scheduling of a single subcarrier or a plurality of subcarriers is not supported. There are mainly three types of newly available terminals. A first-type terminal can send a single subcarrier with a 3.75-kHz orthogonal subcarrier spacing by means of SC-FDMA in an uplink manner, or send a single sub-channel with a 3.75-kHz sub-channel bandwidth by means of FDMA in an uplink manner. A second-type terminal can send a single subcarrier with a 15-kHz orthogonal subcarrier spacing by means of SC-FDMA in an uplink manner. A third-type terminal can send a plurality of subcarriers with a 15-kHz orthogonal subcarrier spacing by means of SC-FDMA in an uplink manner. Certainly, the three types of terminals may be one type of terminal. This type of terminal has functions of one or two or three of the three types of terminals. In addition, all of the three types of terminals support an orthogonal frequency division multiple access OFDMA technology in downlink, and a subcarrier spacing is 15 kHz. The three types of terminals may be three different types of terminals, or may be one type of terminal that has capabilities of one or two or three of the different terminals. For ease of description, the terminals are collectively referred to as three types of terminals. A terminal type and a terminal capability are not specifically limited in the present invention. In addition, the three types of terminals are mainly used for Internet of Things communication. Therefore, a system that supports the three types of newly available terminals may be referred to as a narrowband Internet of Things NBIOT system.

Application scenarios in the embodiments of the present invention can be substantially classified into three types according to different frequency resources that are used. In a first scenario, that is, a scenario of independent deployment, the three types of newly available terminals are supported in dedicated frequency resource networking, and a used frequency resource may be a resource in a frequency band recycled from a GSM system, or in a frequency band used in a 3G system or an LTE system. In the scenario of independent deployment, a system supports only one or more of the three types of newly available terminals, and there are no other types of LTE terminals. In a second scenario, that is, a scenario of guard space deployment, a frequency resource used in a system is located in a guard space between frequency bands used in an LTE system. In a third scenario, that is, a scenario of in-band deployment, a used frequency resource is located in a standard carrier in an LTE system, for example, within a 10-MHz or 20-MHz bandwidth, that is, a common LTE terminal and one or more of the three types of new terminals are all supported within one standard carrier in the LTE system. Therefore, in order that normal communication of a common LTE terminal is not affected, maximum sending power that can be used to send a downlink channel in an NBIOT system in the third scenario may be smaller.

A system architecture of a communications system used in the embodiments of the present invention is shown in FIG. 1. The system architecture diagram includes a base station 101, a user terminal 102, and a communication channel 103.

The base station 101 has a function of scheduling a shared channel, that is, performs scheduling for the user terminal 102 based on a history of having sent packet data to the user terminal 102. Scheduling means that, when a plurality of user terminals 102 share a transmission resource, a mechanism is required to effectively allocate a physical-layer resource, to obtain a statistical multiplexing gain.

There may be a plurality of user terminals 102. In addition, a user terminal 102 has functions of sending and receiving data by using a communication channel 103 established between the user terminal 102 and a base station 101. The user terminal 102 performs sending or receiving processing on a shared channel according to information sent by using a scheduling control channel. Moreover, the user terminal 102 may be a mobile station, a mobile phone, a computer, a portable terminal, or the like. The user terminals 102 may be of a same type, or may be of different types.

Data is received and sent between the base station 101 and the user terminal 102 by using the communication channel 103. The communication channel 103 may be a radio communication channel. The radio communication channel includes at least a shared channel and a scheduling control channel. The shared channel is shared between a plurality of user terminals 102 to send and receive a packet. The scheduling control channel is used to send shared-channel allocation, a corresponding scheduling result, and the like.

Figure 2:
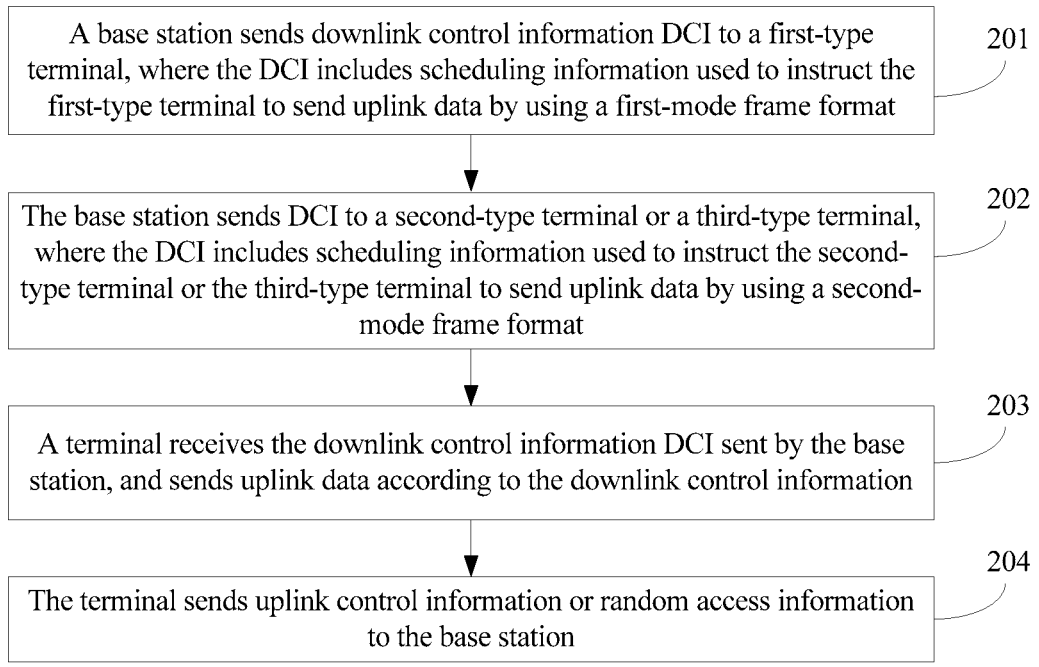
FIG. 2 is a schematic flowchart of a scheduling method according to an embodiment of the present invention.

FIG. 2 is a schematic flowchart of a scheduling method according to an embodiment of the present invention. The method is applied to a communications system. Referring to FIG. 2, the method includes the following several steps.

Step 201. A base station sends downlink control information DCI to a first-type terminal, where the DCI includes scheduling information used to instruct the first-type terminal to send uplink data by using a first-mode frame format.

The first-mode frame format includes at least one uplink subframe, and each uplink subframe includes at least one first-mode frame format symbol. Duration of the first-mode frame format symbol is at least four times of duration of a second-mode frame format symbol, and the second-mode frame format symbol is a single carrier frequency division multiple access SC-FDMA symbol in an LTE system.

It should be noted that, when single carrier frequency division multiple access SC-FDMA is used in uplink, the first-mode frame format symbol may be an SC-FDMA symbol; or when FDMA frequency division multiple access is used in uplink, the first-mode frame format symbol may be an FDMA symbol. This is not specifically limited in this embodiment of the present invention. In addition, the first-mode frame format symbol may be a symbol with a cyclic prefix CP added, or may be a symbol without a CP added. The second-mode frame format symbol may be a symbol with a cyclic prefix CP added, or may be a symbol without a CP added.

When an uplink configuration of the LTE system is a normal cyclic prefix CP, each uplink subframe has 1-millisecond duration and includes 14 SC-FDMA symbols. Therefore, each SC-FDMA symbol in the LTE system includes a normal cyclic prefix and has average $1/14$-millisecond duration. It should be noted that duration of the SC-FDMA symbols included in each uplink subframe in the LTE system may be different. For example, among the 14 SC-FDMA symbols included in each uplink subframe, there are two long SC-FDMA symbols, and duration of each long SC-FDMA symbol is 71.88 microseconds; and there are 12 short SC-FDMA symbols, and duration of each short SC-FDMA symbol is 71.35 microseconds. When an uplink configuration of the LTE system is an extended cyclic prefix CP, each uplink subframe has 1-millisecond duration and includes 12 SC-FDMA symbols that have same duration. Therefore, each SC-FDMA symbol in the LTE system includes an extended cyclic prefix and has $1/12$-millisecond duration. When an SC-FDMA symbol in the LTE system does not include a CP, duration of each symbol is 66.7 microseconds.

The uplink data may be carried on a physical uplink shared channel PUSCH, or carried on a physical channel that is used to send the uplink data and that is defined for the first-type terminal.

The communications system may be a frequency division duplex (Frequency Division Duplex, FDD) system, or may be a time division duplex (Time Division Duplex, TDD) system. Therefore, the second-mode frame format includes a frame structure type 1 applicable to the FDD system and a frame structure type 2 applicable to the TDD system. In addition, first-mode frame formats vary between the FDD communications system and the TDD communications system.

Figure 3:
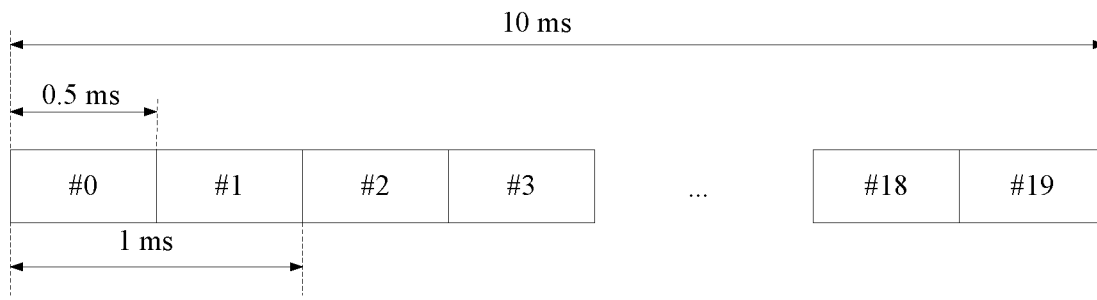
FIG. 3 is a schematic structural diagram of a second-mode frame structure according to an embodiment of the present invention.

The frame structure type 1 applicable to the FDD system and included in the second-mode frame format is shown in FIG. 3. A time length of a radio frame in the frame structure type 1 is 10 milliseconds. A radio frame includes 20 timeslots, each timeslot is 0.5 millisecond, and two timeslots form a subframe. That is, the frame structure type 1 includes 10 subframes, and a length of each subframe is 1 millisecond. In addition, when a normal CP is used, each subframe includes 14 OFDM symbols or SC-FDMA symbols; or when an extended CP is used, each subframe includes 12 OFDM symbols or SC-FDMA symbols.

In addition, the following describes the corresponding first-mode frame format in the FDD system.

Figure 4:
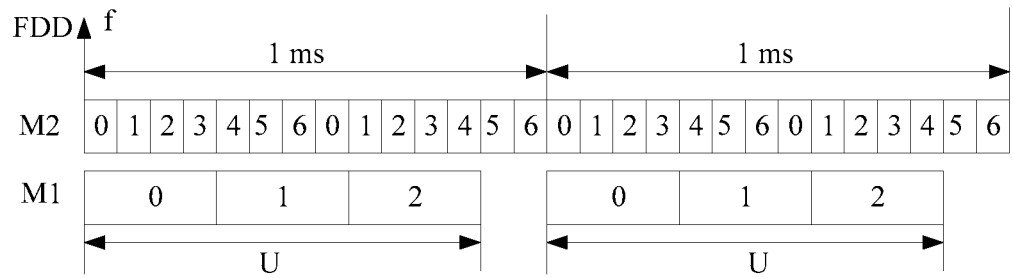
FIG. 4 is a schematic structural diagram of a first-type first-mode frame structure according to an embodiment of the present invention.

Specifically, as shown in FIG. 4, when the communications system is a frequency division duplex FDD system, and uses a normal cyclic prefix CP in uplink, if duration of the uplink subframe is 1 millisecond, the uplink subframe includes three first-mode frame format symbols, and duration of the three first-mode frame format symbols is equal to duration of 12 second-mode frame format symbols and less than 1 millisecond. In this figure, M1 represents the first-mode frame format, values 0 to 2 in M1 represent first-mode frame format symbol numbers, M2 represents the second-mode frame format, values 0 to 6 in M2 represent second-mode frame format symbol numbers, U represents an uplink frame, and duration of a second-mode frame format symbol is duration of each SC-FDMA symbol that includes a normal CP.

Figure 5:
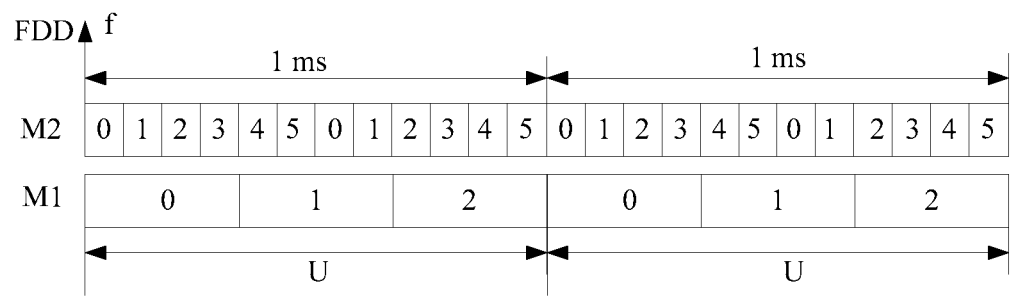
FIG. 5 is a schematic structural diagram of a second-type first-mode frame structure according to an embodiment of the present invention.

As shown in FIG. 5, when the communications system is an FDD system, and uses an extended CP in uplink, if duration of the uplink subframe is 1 millisecond, the uplink subframe includes three first-mode frame format symbols, and duration of the three first-mode frame format symbols is equal to duration of 12 second-mode frame format symbols and equal to 1 millisecond. Duration of a second-mode frame format symbol is duration of each SC-FDMA symbol that includes an extended CP.

Further, when the communications system is the FDD system, a time length of the first-mode frame format or a time length of a radio frame of the first-mode frame format is N*10 milliseconds, where N is 1 or is an even number greater than 0, and the uplink subframe in the first-mode frame format is M milliseconds, where M is an even number greater than 0, and M<=N*10.

Figure 6:
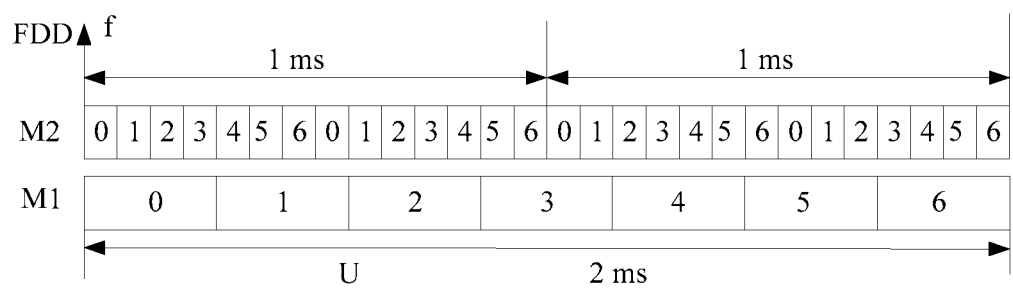
FIG. 6 is a schematic structural diagram of a third-type first-mode frame structure according to an embodiment of the present invention.

As shown in FIG. 6, when duration of the uplink subframe in the first-mode frame format is 2 milliseconds, and the communications system uses a normal CP in uplink, the uplink subframe includes seven first-mode frame format symbols, and duration of the seven first-mode frame format symbols is equal to duration of 28 second-mode frame format symbols and equal to 2 milliseconds. That is, when the communications system uses the normal CP in the uplink, the duration of the seven first-mode frame format symbols is equal to the duration of the 28 second-mode frame format symbols, and duration of a second-mode frame format symbol is duration of each SC-FDMA symbol that includes a normal CP.

As shown in FIG. 7, when duration of the uplink subframe in the first-mode frame format is 2 milliseconds, and the communications system uses an extended CP in uplink, the uplink subframe includes six first-mode frame format symbols, and duration of the six first-mode frame format symbols is equal to duration of 24 second-mode frame format symbols and equal to 2 milliseconds. That is, when the communications system uses the extended CP in the uplink, the duration of the six first-mode frame format symbols is equal to the duration of the 24 second-mode frame format symbols, and duration of a second-mode frame format symbol is duration of each SC-FDMA symbol that includes an extended CP.

Further, an uplink demodulation reference signal is sent on the at least one first-mode frame format symbol in the at least one uplink subframe included in the first-mode frame format. The uplink demodulation reference signal is used to help demodulate uplink data or uplink control information.

That is, when the first-mode frame format includes one uplink subframe, and the uplink subframe includes at least one first-mode frame format symbol, the uplink demodulation reference signal may be sent on one or more of the at least one first-mode frame format symbol; or when the first-mode frame format includes a plurality of uplink subframes, that is, two or more uplink subframes, the uplink demodulation reference signal may be sent in any one or more of the plurality of uplink subframes, and sent on one or more of at least one first-mode frame format symbol included in the uplink subframes.

For example, when the first-mode frame format includes one uplink subframe, and the uplink subframe includes three first-mode frame format symbols, the uplink demodulation reference signal may be sent on any one or two of the three first-mode frame format symbols, or may be sent on all of the three first-mode frame format symbols. When the first-mode frame format includes two uplink subframes, and each uplink subframe includes three first-mode frame format symbols, the uplink demodulation reference signal may be sent in either of the two uplink subframes, or may be sent in both of the uplink subframes, and may be sent on any one or more of first-mode frame format symbols included in the two uplink subframes. This is not limited in this embodiment of the present invention.

Optionally, when the last first-mode frame format symbol of first-mode frame format symbols included within a 1-millisecond time length partially or completely overlaps with the last second-mode frame format symbol within the 1-millisecond time length, no uplink signal or channel is sent on the last first-mode frame format symbol within the 1-millisecond time length. When the first-mode frame format symbol is a symbol including a normal CP, the second-mode frame format symbol is an SC-FDMA symbol including the normal CP. When the first-mode frame format symbol is a symbol including an extended CP, the second-mode frame format symbol is an SC-FDMA symbol including the extended CP. When the first-mode frame format symbol is a symbol that does not include a CP, the second-mode frame format symbol is an SC-FDMA symbol that does not include the CP.

That is, when a border of the first-mode frame format symbol is aligned with a border of the second-mode frame format symbol, in a third scenario, that is, an in-band deployment scenario, in order that sending of a sounding reference signal (Sounding Reference Signal, SRS) by an existing LTE terminal is not affected, when the last first-mode frame format symbol of the first-mode frame format symbols included within a 1-millisecond time length partially or completely overlaps with the last second-mode frame format symbol within the 1-millisecond time length, no uplink signal or channel is sent on the last first-mode frame format symbol within the 1-millisecond time length. Optionally, in a first scenario of independent deployment and a second scenario of guard space deployment, when the last first-mode frame format symbol of first-mode frame format symbols included within a 1-millisecond time length partially or completely overlaps with the last second-mode frame format symbol within the 1-millisecond time length, no uplink signal or channel is sent on the last first-mode frame format symbol within the 1-millisecond time length.

For example, in the first-mode frame format shown in FIG. 5, if the three first-mode frame format symbols are a symbol 0, a symbol 1, and a symbol 2, no uplink signal or channel is sent on the symbol 2. In the first-mode frame format shown in FIG. 6, if the seven first-mode frame format symbols are a symbol 0, a symbol 1, . . . , a symbol 5, and a symbol 6, no uplink signal or channel is sent on the symbol 3 and the symbol 6. In the first-mode frame format shown in FIG. 7, if the six first-mode frame format symbols are a symbol 0, a symbol 1, . . . , a symbol 4, and a symbol 5, no uplink signal or channel is sent on the symbol 2 and the symbol 5.

Further, when the second-mode frame format includes an unavailable uplink subframe, no uplink signal or channel is sent on a corresponding first-mode frame format symbol within duration of the unavailable uplink subframe in the second-mode frame format. The unavailable uplink subframe is one or more uplink subframes. Duration of each uplink subframe is 1 millisecond. The unavailable uplink subframe means that all or some frequency resources in the unavailable uplink subframe are reserved resources. The reserved resources are used for communication between special terminals, or between a terminal and a base station that are supported by a special communications system, or between terminals that are supported by a special communications system. The reserved resources cannot be used for communication between non-special terminals, or between a terminal and a base station that are supported by a non-special communications system, or between terminals that are supported by a non-special communications system. For example, all or some frequency resources in an unavailable uplink subframe in the LTE system are reserved resources, and are used for communication between devices in such a special system, and the reserved resources in the unavailable uplink subframe cannot be used by a common LTE terminal.

The first-type terminal learns of information about the unavailable uplink subframe by receiving system information, including an uplink subframe that is an unavailable uplink subframe, or further including a frequency domain resources in an unavailable uplink subframe that is a reserved resource, or the like.

That is, in the third scenario, that is, the in-band deployment scenario, if the second-mode frame format includes an unavailable uplink subframe, no uplink signal or channel is sent on a corresponding first-mode frame format symbol within duration of the unavailable uplink subframe in the second-mode frame format, or sending of an uplink signal or channel that should be sent on the corresponding first-mode frame format symbol within the duration of the unavailable uplink subframe in the second-mode frame format is deferred until a corresponding first-mode frame format symbol within duration of an available uplink subframe in the second-mode frame format. The available uplink subframe is an uplink subframe in the second-mode frame format other than the unavailable uplink subframe.

Further, the scheduling information includes physical resource information corresponding to the first-mode frame format. The physical resource information includes a time resource and a frequency resource. The time resource includes at least one uplink subframe. The frequency resource includes one subcarrier, and a subcarrier spacing is 3.75 kHz.

The time resource in the physical resource information included in the scheduling information may be referred to as a scheduling length. A minimum scheduling length is a length of three first-mode frame format symbols. An actual scheduling length may be subject to a distance between a base station and a terminal, or a coverage requirement that a terminal needs to meet in a cell. The base station may support at least one scheduling length. For example, for a scheduling length A1, among NA1 consecutive uplink subframes, maximum coverage of LA1 uplink subframes is supported in a cell; for a scheduling length A2, among NA2 consecutive uplink subframes, maximum coverage of LA2 uplink subframes is supported in a cell, and so on. A coverage area of the LA2 uplink subframes is greater than or equal to that of the LA1 uplink subframes, NA1 and NA2 are positive integers, and NA2 is greater than or equal to NA1 and may be preset. This is not specifically limited in this embodiment of the present invention. In addition, for each scheduling length, the frequency resource in the physical resource information included in the scheduling information may be one or more subcarriers. A quantity of subcarriers that are included may be preset. This is not specifically limited in this embodiment of the present invention.

Step 202. The base station sends downlink control information DCI to a second-type terminal or a third-type terminal, where the DCI includes scheduling information used to instruct the second-type terminal or the third-type terminal to send uplink data by using a second-mode frame format.

The second-mode frame format includes the frame structure type 1 applicable to the FDD system and the frame structure type 2 applicable to the TDD system. When the communications system is an FDD system, the second-mode frame format is the frame structure type 1 applicable to the FDD system, and the frame structure type 1 is a radio frame that has a 10-millisecond time length and that includes 20 timeslots. Each timeslot is 0.5 millisecond and two timeslots form one subframe. That is, the second-mode frame format includes 10 subframes, a length of each subframe is 1 millisecond, and a spacing between subcarriers in physical resource information corresponding to the second-mode frame format is 15 kHz.

For example, the downlink control information DCI includes scheduling information used to instruct a terminal to send uplink data, and includes at least one of a quantity of subcarriers used in a frequency domain, a used modulation and coding scheme or modulation scheme, or a quantity of bits included in a carried transport block.

It should be noted that when the communications system is the FDD system, for a specific second-mode frame format, refer to a related technology. Details are not described in this embodiment of the present invention.

Step 203. A terminal receives the downlink control information DCI sent by the base station, and sends uplink data according to the downlink control information.

Specifically, when the terminal is the first-type terminal, the DCI includes the scheduling information used to instruct the first-type terminal to send the uplink data by using the first-mode frame format. After receiving the DCI, the first-type terminal sends the uplink data in the first-mode frame format to the base station. When the terminal is the second-type terminal or the third-type terminal, the DCI includes the scheduling information used to instruct the second-type terminal or the third-type terminal to send the uplink data by using the second-mode frame format. After receiving the scheduling information, the second-type terminal or the third-type terminal sends the uplink data in the second-mode frame format to the base station.

It should be noted that when the terminal is the second-type terminal or the third-type terminal, the scheduling information includes physical resource information corresponding to the second-mode frame format. The physical resource information includes a time resource and a frequency resource. The time resource includes at least one uplink subframe. The frequency resource includes one subcarrier, and a subcarrier spacing is 15 kHz.

The time resource in the physical resource information included in the scheduling information may be referred to as a scheduling length. A minimum scheduling length is a length of an uplink subframe in one second-mode frame format. An actual scheduling length may be subject to a distance between a base station and a terminal, or a coverage requirement that a terminal needs to meet in a cell. The base station may support at least one scheduling length. For example, for a scheduling length B1, among NB1 consecutive uplink subframes, maximum coverage of LB1 uplink subframes is supported in a cell; for a scheduling length B2, among NB2 consecutive uplink subframes, maximum coverage of LB2 uplink subframes is supported in a cell, and so on. A coverage area of the LB2 uplink subframes is greater than or equal to that of the LB1 uplink subframes, NB1 and NB2 are positive integers, and NB2 is greater than or equal to NB1 and may be preset. This is not specifically limited in this embodiment of the present invention. In addition, for each scheduling length, when the terminal is the second-type terminal, the frequency resource in the physical resource information included in the scheduling information includes one subcarrier. When the terminal is the third-type terminal, the frequency resource in the physical resource information included in the scheduling information includes at least one subcarrier (12 subcarriers at maximum).

Optionally, after step 203, the method further includes the following step:

Step 204. The terminal sends uplink control information or random access information to the base station.

Specifically, when the terminal is the first-type terminal, a frame format used for the uplink control information or the random access information is the first-mode frame format. The first-mode frame format includes at least one uplink subframe, and each uplink subframe includes at least one first-mode frame format symbol. Duration of the first-mode frame format symbol is at least four time of duration of a second-mode frame format symbol. The second-mode frame format symbol is an SC-FDMA symbol in the LTE system.

It should be noted that the uplink control information UCI includes an ACK or a NACK, so as to confirm whether the terminal correctly receives downlink data carried on a downlink shared channel PDSCH; or includes channel state information CSI used to reflect downlink channel quality. The uplink control information is carried on a physical uplink control channel PUCCH, or carried on a physical channel that is used to send the uplink control information and that is defined for the first-type terminal. The random access information includes a random access preamble, and is carried on a physical random access channel PRACH, or carried on a physical channel that is used to send uplink random access information and that is defined for the first-type terminal.

When the terminal is the second-type terminal or the third-type terminal, a frame format used for the uplink control information or the random access information is the second-mode frame format. The second-mode frame format includes the frame structure type 1 applicable to the FDD system and the frame structure type 2 applicable to the TDD system. The second-mode frame format includes 10 subframes, a length of each subframe is 1 millisecond, and a spacing between subcarriers in physical resource information corresponding to the second-mode frame format is 15 kHz.

It should be noted that when the terminal sends the uplink control information or the random access information to the base station, a frame format of the uplink control information or the random access information sent by the terminal may be the first-mode frame format or the second-mode frame format, and the first-mode frame format and the second-mode frame format not only can be obtained from the downlink control information DCI sent by the base station, but also can be preset. After the setting, the first-type terminal may directly use the first-mode frame format to send the uplink control information or the random access information, or the second-type terminal or the third-type terminal may directly use the second-mode frame format to send the uplink control information or the random access information. This is not limited in this embodiment of the present invention.

For example, the first-mode frame format is preset. That is, the first-mode frame format is correspondingly used at one or several specified carrier frequencies used in the communications system, or the first-mode frame format is correspondingly used for a specified downlink synchronization signal sequence or a specified format for sending a downlink synchronization signal, that is, at a specific time and/or frequency resource mapping location, or the first-mode frame format is correspondingly used for a format that is used for sending downlink system information and that is included or specified in the downlink system information, that is, at a specific time and/or frequency resource mapping location. The terminal may directly send the uplink control information or the random access information that uses a first frame format to the base station after learning, according to the specified correspondence or indication information in the downlink system information, that the first-mode frame format is used.

According to the scheduling method provided in this embodiment of the present invention, the base station sends the downlink control information DCI to the first-type terminal. The DCI includes the scheduling information used to instruct the first-type terminal to send the uplink data by using the first-mode frame format, the first-mode frame format includes the at least one uplink subframe, each uplink subframe includes the at least one first-mode frame format symbol, and the duration of the first-mode frame format symbol is at least four times of duration of the second-mode frame format symbol. The second-mode frame format symbol is the SC-FDMA symbol in the LTE system. The base station sends the downlink control information DCI to the second-type terminal or the third-type terminal. The DCI includes the scheduling information used to instruct the second-type terminal or the third-type terminal to send the uplink data by using the second-mode frame format. In this way, the base station in the LTE system can support an existing LTE terminal, and also support the first-type terminal, the second-type terminal, and the third-type terminal that are newly available in the FDD system. This saves a frequency resource, and also improves utilization of the base station.

FIG. 8 is a schematic flowchart of a scheduling method according to an embodiment of the present invention. The method is applied to a communications system, and includes the following several steps.

Step 301. A base station sends downlink control information DCI to a first-type terminal, where the DCI includes scheduling information used to instruct the first-type terminal to send uplink data by using a first-mode frame format.

The first-mode frame format includes at least one uplink subframe, and each uplink subframe includes at least one first-mode frame format symbol. Duration of the first-mode frame format symbol is at least four times of duration of a second-mode frame format symbol. The second-mode frame format symbol is an SC-FDMA symbol in an LTE system.

When an uplink configuration of the LTE system is a normal cyclic prefix CP, each uplink subframe has 1-millisecond duration and includes 14 SC-FDMA symbols. Therefore, each SC-FDMA symbol in the LTE system includes a normal cyclic prefix and has average ¹⁄₁₄-millisecond duration. It should be noted that duration of the SC-FDMA symbols included in each uplink subframe in the LTE system may be different. For example, among the 14 SC-FDMA symbols included in each uplink subframe, there are two long SC-FDMA symbols, and duration of each long SC-FDMA symbol is 71.88 microseconds; and there are 12 short SC-FDMA symbols, and duration of each short SC-FDMA symbol is 71.35 microseconds. When an uplink configuration of the LTE system is an extended cyclic prefix CP, each uplink subframe has 1-millisecond duration and includes 12 SC-FDMA symbols that have same duration. Therefore, each SC-FDMA symbol in the LTE system includes an extended cyclic prefix and has ¹⁄₁₂-millisecond duration. When an SC-FDMA symbol in the LTE system does not include a CP, duration of each symbol is 66.7 microseconds.

In addition, uplink data may be carried on a physical uplink shared channel PUSCH, or carried on a physical channel that is used to send the uplink data and that is defined for the first-type terminal.

It should be noted that, when SC-FDMA is used in uplink, the first-mode frame format symbol may be an SC-FDMA symbol; or when FDMA frequency division multiple access is used in uplink, the first-mode frame format symbol may be an FDMA symbol. This is not specifically limited in this embodiment of the present invention. In addition, the first-mode frame format symbol may be a symbol with a cyclic prefix CP added, or may be a symbol without a CP added. The second-mode frame format symbol may be a symbol with a cyclic prefix CP added, or may be a symbol without a CP added.

The communications system may be a frequency division duplex FDD system, or may be a time division duplex TDD system. Therefore, the second-mode frame format includes a frame structure type 1 applicable to the FDD system and a frame structure type 2 applicable to the TDD system. In addition, first-mode frame formats vary between the FDD communications system and the TDD communications system.

Figure 9:
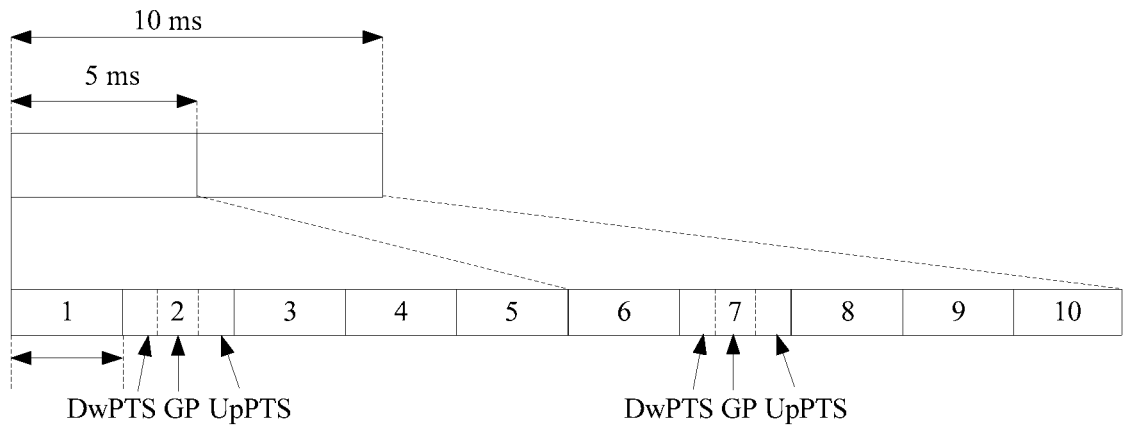
FIG. 9 is a schematic structural diagram of another second-mode frame structure according to an embodiment of the present invention.

The frame structure type 2 applicable to the TDD system and included in the second-mode frame format is shown in FIG. 9. The second-mode frame format includes a 10-millisecond radio frame that includes two 5-millisecond half-frames. Each half-frame includes five 1-millisecond subframes, and includes a downlink subframe, a special subframe, and an uplink subframe. The special subframe includes a downlink pilot timeslot DwPTS, an uplink pilot timeslot UpPTS, and a guard period GP. When a 5-millisecond period is used for a downlink-to-uplink switch point, the special subframe exists in both half-frames. When a 10-millisecond period is used for a downlink-to-uplink switch point, the special subframe exists in only a first half-frame. In addition, when a normal CP is used, each subframe includes 14 OFDM symbols or SC-FDMA symbols; or when an extended CP is used, each subframe includes 12 OFDM symbols or SC-FDMA symbols.

In addition, the following describes the corresponding first-mode frame format in the TDD system.

Specifically, when the communications system is a time division duplex TDD system, the first-mode frame format includes at least one uplink subframe, and further includes at least one special subframe and at least one downlink subframe. The special subframe includes at least one of a downlink pilot timeslot DwPTS, an uplink pilot timeslot UpPTS, or a guard period GP.

When the communications system is a TDD system, the second-mode frame format is the frame structure type 2. Uplink and downlink configurations in the second-mode frame format are shown in Table 1, where D represents a downlink subframe, S represents a special subframe, and U represents an uplink subframe. Duration of each subframe is 1 millisecond. The special subframe includes a downlink pilot timeslot DwPTS, an uplink pilot timeslot UpPTS, and a guard period GP. When the first-mode frame format includes an UpPTS, and a length of the UpPTS in the first-mode frame format is less than or equal to a length of an UpPTS in the second-type frame format, no uplink signal or channel is sent in the UpPTS included in the first-mode frame format. A length of a DwPTS/a GP/an UpPTS in a special subframe in the second-mode frame format is shown in Table 2.

TABLE 1

| Configuration | Switch period | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Configuration | DwPTS | UpPTS | | DwPTS | UpPTS | |
|---|---|---|---|---|---|---|
| | | Normal CP | Extended CP | | Normal CP | Extended CP |
| 0 | 6592Ts | 2192Ts | 2560Ts | 7680Ts | 2192Ts | 2560Ts |
| 1 | 19760Ts | | | 20480Ts | | |
| 2 | 21952Ts | | | 23040Ts | | |
| 3 | 24144Ts | | | 25600Ts | | |
| 4 | 26336Ts | | | 7680Ts | 4384Ts | 5120Ts |
| 5 | 6592Ts | 4384Ts | 5120Ts | 20480Ts | | |
| 6 | 19760Ts | | | 23040Ts | | |
| 7 | 21952Ts | | | 12800Ts | | |
| 8 | 24144Ts | | | — | — | — |
| 9 | 13168Ts | | | — | — | — |

It should be noted that Ts is a base unit of a time domain in the LTE system, where Ts=1/(15000*2048) seconds.

When the communications system is the TDD system, each uplink subframe includes at least one first-mode frame format symbol, and a time length of each special subframe is 1 millisecond. When the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

Figure 10:
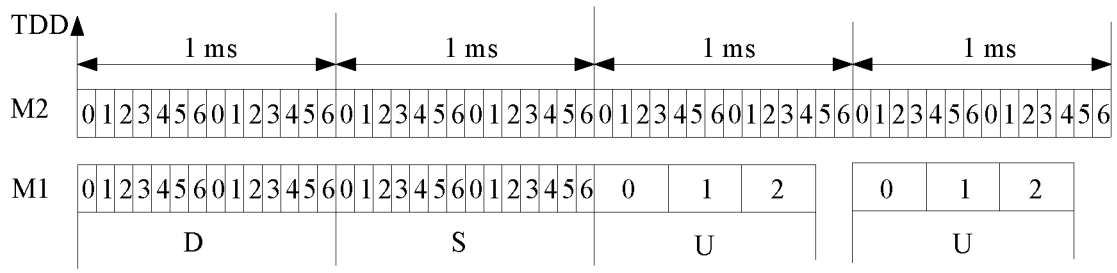
FIG. 10 is a schematic structural diagram of a fifth-type first-mode frame structure according to an embodiment of the present invention.

As shown in FIG. 10, when the communications system uses a normal CP in uplink, and duration of an uplink subframe is 1 millisecond, the uplink subframe includes three first-mode frame format symbols, and duration of the three first-mode frame format symbols is equal to duration of 12 second-mode frame format symbols and less than 1 millisecond. Duration of a second-mode frame format symbol is duration of each SC-FDMA symbol that includes a normal cyclic prefix. In this figure, D represents a downlink subframe, and S represents a special subframe.

Figure 11:
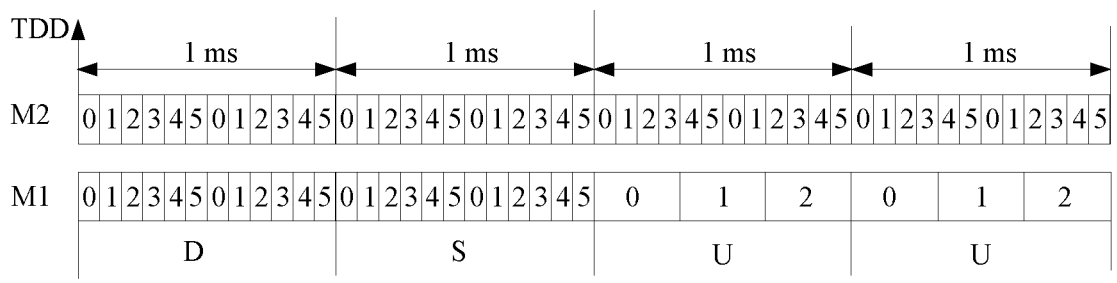
FIG. 11 is a schematic structural diagram of a sixth-type first-mode frame structure according to an embodiment of the present invention.

As shown in FIG. 11, when the communications system uses an extended CP in uplink, and duration of an uplink subframe is 1 millisecond, the uplink subframe includes three first-mode frame format symbols, and duration of the three first-mode frame format symbols is equal to duration of 12 second-mode frame format symbols and equal to 1 millisecond, where duration of a second-mode frame format symbol is duration of each SC-FDMA symbol that includes an extended cyclic prefix.

Further, Uplink and downlink configurations of the first-mode frame format are shown in Table 1, where D represents a downlink subframe, S represents a special subframe, and U represents an uplink subframe. Configurations of the special subframe are shown in Table 2. Duration of each uplink subframe is 1 millisecond.

Optionally, when the last symbol of first-mode frame format symbols included within a 1-millisecond time length partially or completely overlaps with the last second-mode frame format symbol within the 1-millisecond time length, no uplink signal or channel is sent in the last first-mode frame format symbol within the 1-millisecond time length. When the first-mode frame format symbol is a symbol including a normal CP, the second-mode frame format symbol is an SC-FDMA symbol including the normal CP. When the first-mode frame format symbol is a symbol including an extended CP, the second-mode frame format symbol is an SC-FDMA symbol including the extended CP. When the first-mode frame format symbol is a symbol that does not include a CP, the second-mode frame format symbol is an SC-FDMA symbol that does not include the CP.

That is, in a third scenario, that is, a scenario of in-band deployment, if the last symbol of the first-mode frame format symbols included within a 1-millisecond time length partially or completely overlaps with the last second-mode frame format symbol within the 1-millisecond time length, in order that sending of an SRS by an existing LTE terminal is not affected, when the last first-mode frame format symbol of the first-mode frame format symbols included within the 1-millisecond time length partially or completely overlaps with the last second-mode frame format symbol within the 1-millisecond time length, no uplink signal or channel is sent on the last first-mode frame format symbol within the 1-millisecond time length. Optionally, in a first scenario of independent deployment and a second scenario of guard space deployment, when the last first-mode frame format symbol of first-mode frame format symbols included within a 1-millisecond time length partially or completely overlaps with the last second-mode frame format symbol within the 1-millisecond time length, no uplink signal or channel is sent on the last first-mode frame format symbol within the 1-millisecond time length.

For example, in the first-mode frame format shown in FIG. 11, if the three first-mode frame format symbols are a symbol 0, a symbol 1, and a symbol 2, no uplink signal or channel is sent on the symbol 2.

Further, when the communications system is the TDD system, a 5-millisecond period is used for a downlink-to-uplink switch point in the first-mode frame format. One downlink subframe, one special subframe, and at least one uplink subframe are included within a 5-millisecond time length, each uplink subframe includes at least one first-mode frame format symbol, and a time length of each special subframe is 1 millisecond. When the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

Figure 12:
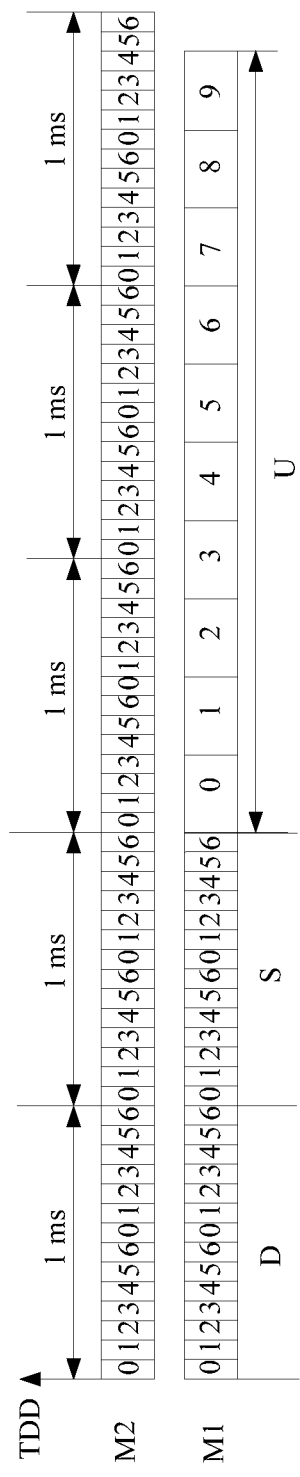
FIG. 12 is a schematic structural diagram of a seventh-type first-mode frame structure according to an embodiment of the present invention.

As shown in FIG. 12, when the communications system uses a normal CP in uplink, and duration of an uplink subframe is 3 milliseconds, the uplink subframe includes 10 first-mode frame format symbols, and duration of the 10 first-mode frame format symbols is equal to duration of 40 second-mode frame format symbols and less than 3 milliseconds, where duration of a second-mode frame format symbol is duration of each SC-FDMA symbol that includes a normal cyclic prefix.

Figure 13:
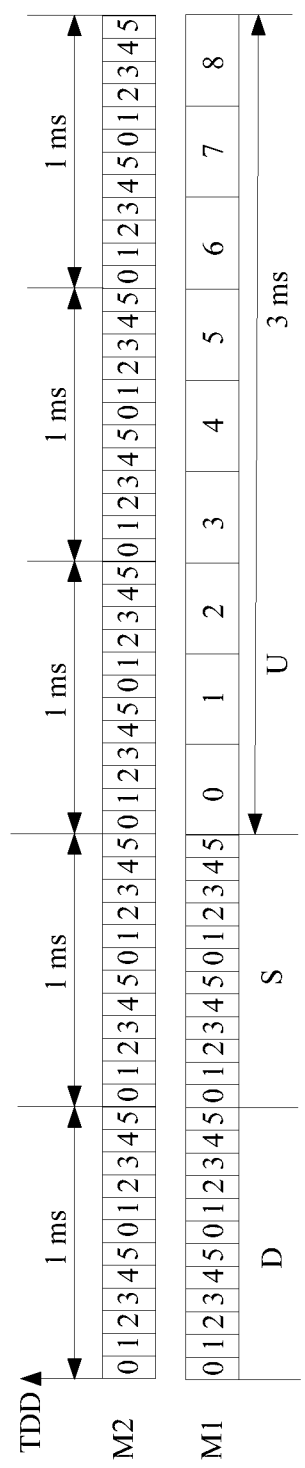
FIG. 13 is a schematic structural diagram of an eighth-type first-mode frame structure according to an embodiment of the present invention.

As shown in FIG. 13, when the communications system uses an extended CP in uplink, and duration of an uplink subframe is 3 milliseconds, the uplink subframe includes nine first-mode frame format symbols, and duration of the nine first-mode frame format symbols is equal to duration of 36 second-mode frame format symbols and equal to 3 milliseconds, where duration of a second-mode frame format symbol is duration of each SC-FDMA symbol that includes an extended cyclic prefix.

For example, in the first-mode frame format shown in FIG. 12, if the 10 first-mode frame format symbols are a symbol 0, a symbol 1, . . . , a symbol 8, and a symbol 9, no uplink signal or channel is sent on the symbol 3 and the symbol 6; in the first-mode frame format shown in FIG. 13, if the nine first-mode frame format symbols are a symbol 0, a symbol 1, . . . , a symbol 7, and a symbol 8, no uplink signal or channel is sent on the symbol 2, the symbol 5, and the symbol 8.

Figure 14:
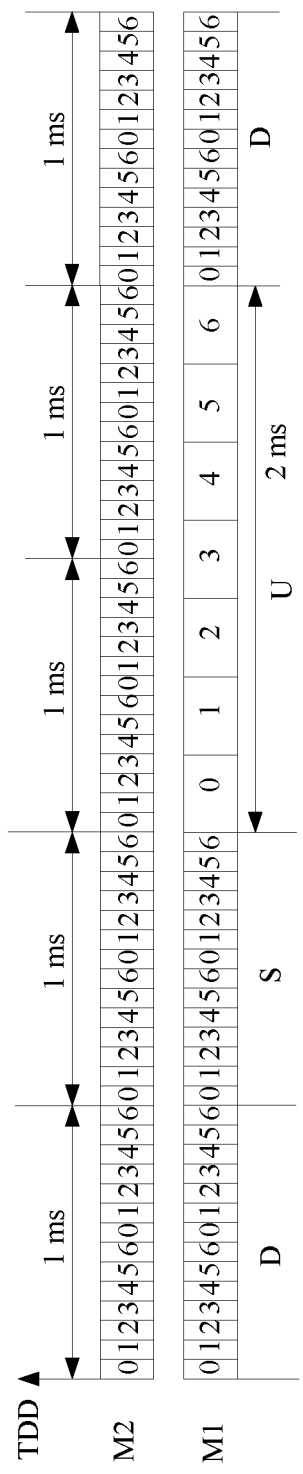
FIG. 14 is a schematic structural diagram of a ninth-type first-mode frame structure according to an embodiment of the present invention.

As shown in FIG. 14, when the communications system uses a normal CP in uplink, if duration of an uplink subframe is 2 milliseconds, the uplink subframe includes seven first-mode frame format symbols, and duration of the seven first-mode frame format symbols is equal to duration of 28 second-mode frame format symbols and equal to 2 milliseconds, where duration of a second-mode frame format symbol is duration of each SC-FDMA symbol that includes a normal cyclic prefix.

Figure 15:
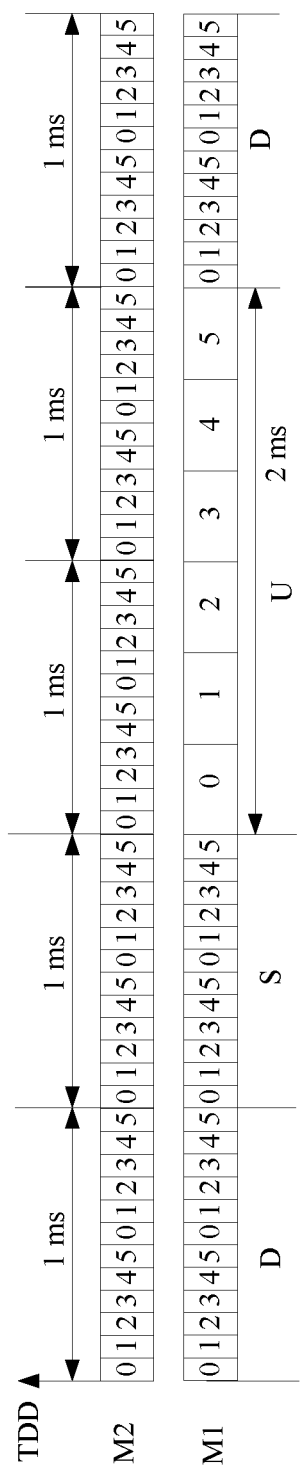
FIG. 15 is a schematic structural diagram of a tenth-type first-mode frame structure according to an embodiment of the present invention.

As shown in FIG. 15, when the communications system uses an extended CP in uplink, if duration of an uplink subframe is 2 milliseconds, the uplink subframe includes six first-mode frame format symbols, and duration of the six first-mode frame format symbols is equal to duration of 24 second-mode frame format symbols and equal to 2 milliseconds, where duration of a second-mode frame format symbol is duration of each SC-FDMA symbol that includes an extended cyclic prefix.

Optionally, in the first-mode frame format shown in FIG. 14, if the seven first-mode frame format symbols are a symbol 0, a symbol 1, . . . , a symbol 5, and a symbol 6, no uplink signal or channel is sent on the symbol 3 and the symbol 6. In the first-mode frame format shown in FIG. 15, if the six first-mode frame format symbols are a symbol 0, a symbol 1, . . . , and a symbol 5, no uplink signal or channel is sent on the symbol 2 and the symbol 5.

Figure 16:
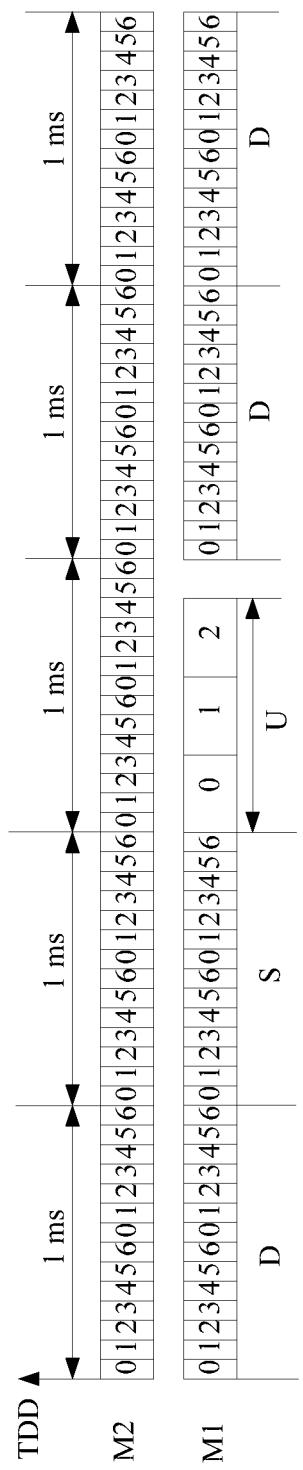
FIG. 16 is a schematic structural diagram of an eleventh-type first-mode frame structure according to an embodiment of the present invention.

In addition, as shown in FIG. 16, when the communications system uses a normal CP in uplink, if duration of an uplink subframe is 1 millisecond, the uplink subframe includes three first-mode frame format symbols, and duration of the three first-mode frame format symbols is equal to duration of 12 second-mode frame format symbols and less than 1 millisecond, where duration of a second-mode frame format symbol is duration of each SC-FDMA symbol that includes a normal cyclic prefix.

Figure 17:
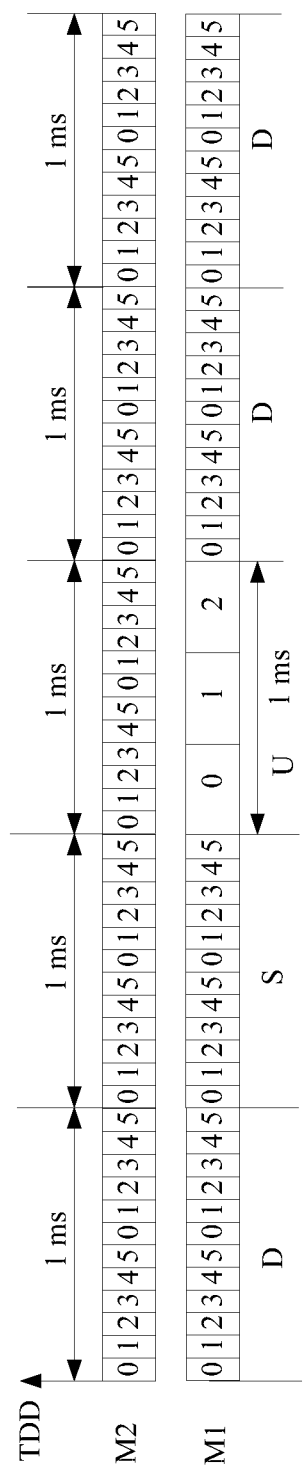
FIG. 17 is a schematic structural diagram of a twelfth-type first-mode frame structure according to an embodiment of the present invention.

In addition, as shown in FIG. 17, when the communications system uses an extended CP in uplink, if duration of an uplink subframe is 1 millisecond, the uplink subframe includes three first-mode frame format symbols, and duration of the three first-mode frame format symbols is equal to duration of 12 second-mode frame format symbols and equal to 1 millisecond, where duration of a second-mode frame format symbol is duration of each SC-FDMA symbol that includes an extended cyclic prefix.

Optionally, in the first-mode frame format shown in FIG. 17, if the three first-mode frame format symbols are a symbol 0, a symbol 1, and a symbol 2, no uplink signal or channel is sent on the symbol 3.

Further, when the communications system is the TDD system, a 5-millisecond period is used for a downlink-to-uplink switch point in the first-mode frame format. One downlink subframe, one special subframe, and at least one uplink subframe are included within a 5-millisecond time length, and each uplink subframe includes at least one first-mode frame format symbol. Each special subframe includes at least one of a DwPTS or a GP, a length of the DwPTS or the GP is the same as that of a DwPTS or a GP in a special subframe in the frame structure type 2 in the LTE system, and varies with configurations of the special subframe. As shown in Table 2, a total time length of the DwPTS and the GP is less than 1 millisecond.

Specifically, when the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

Figure 18:
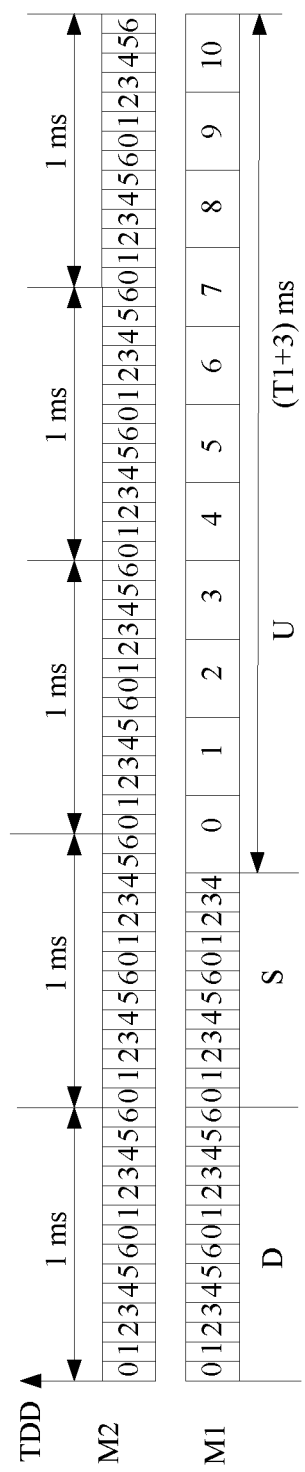
FIG. 18 is a schematic structural diagram of a thirteenth-type first-mode frame structure according to an embodiment of the present invention.

As shown in FIG. 18, when the communications system uses a normal CP in uplink, and the DwPTS and the GP that are included in the special subframe meet a configuration 5, 6, 7, 8, or 9 of the special subframe in Table 2, if duration of an uplink subframe is (T1+3) milliseconds, the uplink subframe includes 11 first-mode frame format symbols, and duration of the 11 first-mode frame format symbols is equal to duration of 44 second-mode frame format symbols and equal to (T1+3) milliseconds, where T1 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix.

Optionally, in the first-mode frame format shown in FIG. 18, if the 11 first-mode frame format symbols include a symbol 0, a symbol 1, . . . , a symbol 9, and a symbol 10, no uplink signal or channel is sent on the symbol 0, the symbol 3, the symbol 7, and the symbol 10.

Figure 19:
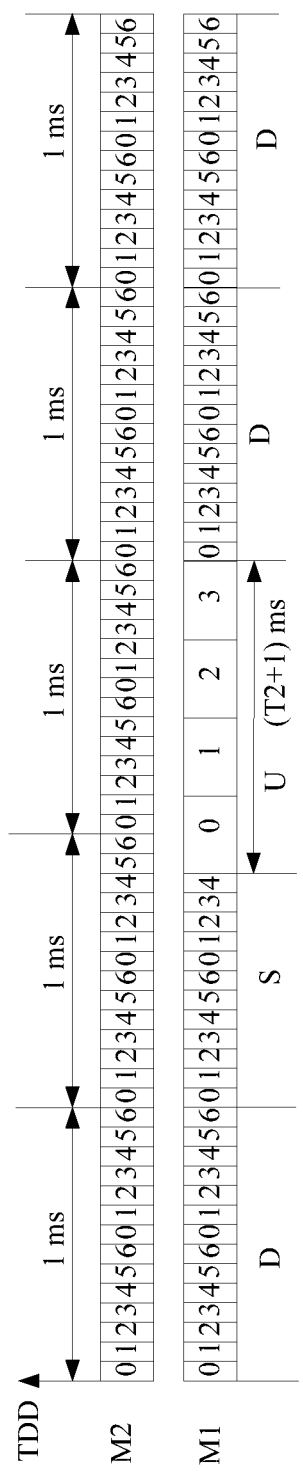
FIG. 19 is a schematic structural diagram of a fourteenth-type first-mode frame structure according to an embodiment of the present invention.

As shown in FIG. 19, when the communications system uses a normal CP in uplink, and the DwPTS and the GP that are included in the special subframe meet a configuration 5, 6, 7, 8, or 9 of the special subframe in Table 2, if duration of an uplink subframe is (T2+1) milliseconds, the uplink subframe includes four first-mode frame format symbols, and duration of the four first-mode frame format symbols is equal to duration of 16 second-mode frame format symbols and equal to (T2+1) milliseconds, where T2 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix.

Optionally, in the first-mode frame format shown in FIG. 19, if the four first-mode frame format symbols are a symbol 0, a symbol 1, a symbol 2, and a symbol 3, no uplink signal or channel is sent on the symbol 0 and the symbol 3.

Further, when the communications system is the TDD system, a 10-millisecond period is used for a downlink-to-uplink switch point in the first-mode frame format. One downlink subframe, one special subframe, and at least one uplink subframe are included within a time length of the first 5 milliseconds, and only a downlink subframe is included within a time length of the last 5 milliseconds; and duration of each downlink subframe is 1 millisecond. Each uplink subframe includes at least one first-mode frame format symbol. In the first-mode frame formats shown in FIG. 18 and FIG. 19, if each special subframe includes at least one of a DwPTS or a GP, and a length of the DwPTS or the GP is the same as that of a DwPTS or a GP in a special subframe in the frame structure type 2 in the LTE system, lengths of DwPTSs or GPs corresponding to different special subframe configurations in Table 2 are different, and a total time length of the DwPTS and the GP is less than 1 millisecond.

Specifically, when the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

When the communications system uses a normal CP in uplink, if duration of an uplink subframe within a time length of the first 5 milliseconds is 3 milliseconds, the uplink subframe includes 10 first-mode frame format symbols, and duration of the 10 first-mode frame format symbols is equal to duration of 40 second-mode frame format symbols and less than 3 milliseconds, where duration of a second-mode frame format symbol is duration of each SC-FDMA symbol that includes a normal cyclic prefix, as specifically shown in FIG. 12. When the DwPTS and the GP that are included in the special subframe meet a configuration 5, 6, 7, 8, or 9 of the special subframe in Table 2, if duration of an uplink subframe within a time length of the first 5 milliseconds is (T1+3) milliseconds, the uplink subframe includes 11 first-mode frame format symbols, and duration of the 11 first-mode frame format symbols is equal to duration of 44 second-mode frame format symbols and equal to (T1+3) milliseconds, where T1 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix, as specifically shown in FIG. 18. Only a downlink subframe is included within a time length of the last 5 milliseconds, and the downlink subframe is consistent with a downlink subframe in the second-mode frame format. Details are not described in this embodiment of the present invention.

When the communications system uses an extended CP in uplink, if duration of an uplink subframe within a time length of the first 5 milliseconds is 3 milliseconds, the uplink subframe includes nine first-mode frame format symbols, and duration of the nine first-mode frame format symbols is equal to duration of 36 second-mode frame format symbols and equal to 3 milliseconds, where duration of a second-mode frame format symbol is duration of each SC-FDMA symbol that includes an extended cyclic prefix, as specifically shown in FIG. 13. Only a downlink subframe is included within a time length of the last 5 milliseconds, and the downlink subframe is consistent with a downlink subframe in the second-mode frame format. Details are not described in this embodiment of the present invention.

Optionally, when the communications system uses a normal CP in uplink, and duration of an uplink subframe within a time length of the first 5 milliseconds is 2 milliseconds, the uplink subframe includes seven first-mode frame format symbols, and duration of the seven first-mode frame format symbols is equal to duration of 28 second-mode frame format symbols and less than 2 milliseconds, where duration of a second-mode frame format symbol is duration of each SC-FDMA symbol that includes a normal cyclic prefix, as specifically shown in FIG. 14. Only a downlink subframe is included within a time length of the last 5 milliseconds, and the downlink subframe is consistent with a downlink subframe in the second-mode frame format. Details are not described in this embodiment of the present invention.

When the communications system uses an extended CP in uplink, and duration of an uplink subframe within a time length of the first 5 milliseconds is 2 milliseconds, the uplink subframe includes six first-mode frame format symbols, and duration of the six first-mode frame format symbols is equal to duration of 24 second-mode frame format symbols and equal to 2 milliseconds, where duration of a second-mode frame format symbol is duration of each SC-FDMA symbol that includes an extended cyclic prefix, as specifically shown in FIG. 15. Only a downlink subframe is included within a time length of the last 5 milliseconds, and the downlink subframe is consistent with a downlink subframe in the second-mode frame format. Details are not described in this embodiment of the present invention.

Optionally, when the communications system uses a normal CP in uplink, if duration of an uplink subframe within a time length of the first 5 milliseconds is 1 millisecond, the uplink subframe includes three first-mode frame format symbols, and duration of the three first-mode frame format symbols is equal to duration of 12 second-mode frame format symbols and less than 1 millisecond, as specifically shown in FIG. 16. When the DwPTS and the GP that are included in the special subframe meet a configuration 5, 6, 7, 8, or 9 of the special subframe, if duration of an uplink subframe within a time length of the first 5 milliseconds is (T2+1) milliseconds, the uplink subframe includes four first-mode frame format symbols, and duration of the four first-mode frame format symbols is equal to duration of 16 second-mode frame format symbols and equal to (T2+1) milliseconds, where T2 is 1 millisecond minus a time occupied by the DwPTS minus a time occupied by the GP, the time occupied by the DwPTS and the time occupied by the GP are in a unit of millisecond, and duration of a second-mode frame format symbol is duration of each SC-FDMA symbol that includes a normal cyclic prefix, as specifically shown in FIG. 19. Only a downlink subframe is included within a time length of the last 5 milliseconds, and the downlink subframe is consistent with a downlink subframe in the second-mode frame format. Details are not described in this embodiment of the present invention.

When the communications system uses an extended CP in uplink, if duration of an uplink subframe within a time length of the first 5 milliseconds is 1 millisecond, the uplink subframe includes three first-mode frame format symbols, and duration of the three first-mode frame format symbols is equal to duration of 12 second-mode frame format symbols and equal to 1 millisecond, where duration of a second-mode frame format symbol is duration of each SC-FDMA symbol that includes an extended cyclic prefix, as specifically shown in FIG. 17. Only a downlink subframe is included within a time length of the last 5 milliseconds, and the downlink subframe is consistent with a downlink subframe in the second-mode frame format. Details are not described in this embodiment of the present invention.

Further, when the communications system is the TDD system, a 5-millisecond period is used for a downlink-to-uplink switch point in the first-mode frame format, and duration of an uplink subframe included within a time length of 5 milliseconds is different from duration of an uplink subframe included within a time length of next 5 milliseconds, where one downlink subframe, one special subframe, and at least one uplink subframe are included within each 5-millisecond time length, each uplink subframe includes at least one first-mode frame format symbol, and a time length of each special subframe is less than or equal to 1 millisecond. When the communications system uses a normal CP in downlink, a length of each downlink subframe is a length of 14 orthogonal frequency division multiplexing OFDM symbols; or when the communications system uses an extended CP in downlink, a length of each downlink subframe is a length of 12 orthogonal frequency division multiplexing OFDM symbols.

When the communications system uses a normal CP in uplink, if duration of an uplink subframe included within the time length of the 5 milliseconds is 3 milliseconds, the uplink subframe includes 10 first-mode frame format symbols, and duration of the 10 first-mode frame format symbols is equal to duration of 40 second-mode frame format symbols and less than 3 milliseconds, where duration of a second-mode frame format symbol is duration of each SC-FDMA symbol that includes a normal cyclic prefix, as specifically shown in FIG. 12. When the DwPTS and the GP that are included in the special subframe meet a configuration 5, 6, 7, 8, or 9 of the special subframe in Table 2, if duration of an uplink subframe included within the time length of the 5 milliseconds is (T1+3) milliseconds, the uplink subframe includes 11 first-mode frame format symbols, and duration of the 11 first-mode frame format symbols is equal to duration of 44 second-mode frame format symbols and equal to 3 milliseconds, where duration of a second-mode frame format symbol is duration of each SC-FDMA symbol that includes a normal cyclic prefix, as specifically shown in FIG. 18. If duration of an uplink subframe included within the time length of the next 5 milliseconds is 2 milliseconds, the uplink subframe includes seven first-mode frame format symbols, and duration of the seven first-mode frame format symbols is equal to duration of 28 second-mode frame format symbols and equal to 2 milliseconds, where duration of a second-mode frame format symbol is duration of each SC-FDMA symbol that includes a normal cyclic prefix, as specifically shown in FIG. 14.

In addition, when the communications system uses an extended CP in uplink, if duration of an uplink subframe included within the time length of the 5 milliseconds is 3 milliseconds, the uplink subframe includes nine first-mode frame format symbols, and duration of the nine first-mode frame format symbols is equal to duration of 36 second-mode frame format symbols and equal to 3 milliseconds, where duration of a second-mode frame format symbol is duration of each SC-FDMA symbol that includes an extended cyclic prefix, as specifically shown in FIG. 13. If duration of an uplink subframe included within the time length of the next 5 milliseconds is 2 milliseconds, the uplink subframe includes six first-mode frame format symbols, and duration of the six first-mode frame format symbols is equal to duration of 24 second-mode frame format symbols and equal to 2 milliseconds, where duration of a second-mode frame format symbol is duration of each SC-FDMA symbol that includes an extended cyclic prefix, as specifically shown in FIG. 15.

Further, when the second-mode frame format includes an unavailable uplink subframe, no uplink signal or channel is sent on a corresponding first-mode frame format symbol within duration of the unavailable uplink subframe in the second-mode frame format. The unavailable uplink subframe is one or more unavailable uplink subframes, and duration of each uplink subframe is 1 millisecond. The unavailable uplink subframe means that all or some frequency resources in the unavailable uplink subframe are reserved resources. The reserved resources are used for communication between special terminals, or between a terminal and a base station that are supported by a special communications system, or between terminals that are supported by a special communications system. The reserved resources cannot be used for communication between non-special terminals, or between a terminal and a base station that are supported by a non-special communications system, or between terminals that are supported by a non-special communications system. For example, all or some frequency resources in an unavailable uplink subframe in the LTE system are reserved resources, and are used for communication between devices in such a special system. The reserved resources cannot be used by a common LTE terminal in the unavailable uplink subframe.

The first-type terminal learns of information about the unavailable uplink subframe by receiving system information, including an uplink subframe that is an unavailable uplink subframe, or further including a frequency domain resource in an unavailable uplink subframe that is a reserved resource, or the like.

That is, in the third scenario, that is, the in-band deployment scenario, if the second-mode frame format includes an unavailable uplink subframe, no uplink signal or channel is sent on a corresponding first-mode frame format symbol within duration of the unavailable uplink subframe in the second-mode frame format, or sending of an uplink signal or channel that should be sent on the corresponding first-mode frame format symbol within the duration of the unavailable uplink subframe in the second-mode frame format is deferred until a corresponding first-mode frame format symbol within duration of an available uplink subframe in the second-mode frame format.

Optionally, an uplink demodulation reference signal is sent on the at least one first-mode frame format symbol in the at least one uplink subframe.

That is, when the first-mode frame format includes one uplink subframe, and the uplink subframe includes at least one first-mode frame format symbol, the uplink demodulation reference signal may be sent on one or more of the at least one first-mode frame format symbol; or when the first-mode frame format includes a plurality of uplink subframes, that is, two or more uplink subframes, the uplink demodulation reference signal may be sent in any one or more of the plurality of uplink subframes, and sent on any one or more of at least one first-mode frame format symbol included in the uplink subframes.

For example, when the first-mode frame format includes one downlink subframe, one special subframe, and one uplink subframe, and the uplink subframe includes three first-mode frame format symbols, the uplink demodulation reference signal may be sent on any one or two of the three first-mode frame format symbols, or may be sent on all of the three first-mode frame format symbols. When the first-mode frame format includes one downlink subframe, one special subframe, and two uplink subframes, and each uplink subframe includes three first-mode frame format symbols, the uplink demodulation reference signal may be sent in either of the two uplink subframes, or may be sent in both of the uplink subframes, and may be sent on any one or more of first-mode frame format symbols included in the two uplink subframes. This is not limited in this embodiment of the present invention.

Further, the scheduling information includes physical resource information corresponding to the first-mode frame format. The physical resource information includes a time resource and a frequency resource. The time resource includes at least one uplink subframe. The frequency resource includes one subcarrier.

The time resource in the physical resource information included in the scheduling information may be referred to as a scheduling length. A minimum scheduling length is a length of three first-mode frame format symbols. An actual scheduling length may be subject to a distance between a base station and a terminal, or a coverage requirement that a terminal needs to meet in a cell. The base station may support at least one scheduling length. For example, for a scheduling length C1, among NC1 consecutive uplink subframes, maximum coverage of LC1 uplink subframes is supported in a cell; for a scheduling length C2, among NC2 consecutive uplink subframes, maximum coverage of LC2 uplink subframes is supported in a cell, and so on. A coverage area of the LC2 uplink subframes is greater than or equal to that of the LC1 uplink subframes, NC1 and NC2 are positive integers, and NC2 is greater than or equal to NC1 and may be preset. This is not specifically limited in this embodiment of the present invention. In addition, for each scheduling length, the frequency resource in physical resource information included in the scheduling information is one subcarrier.

Step 302. The base station sends downlink control information DCI to a second-type terminal or a third-type terminal, where the DCI includes scheduling information used to instruct the second-type terminal or the third-type terminal to send uplink data by using a second-mode frame format.

The second-mode frame format includes a frame structure type 1 applicable to an FDD system and a frame structure type 2 applicable to a TDD system. When the communications system is a TDD system, the second-mode frame format is the frame structure type 2 applicable to the TDD system, and the frame structure type 2 includes one 10-millisecond radio frame that includes two 5-millisecond half-frames. Each half-frame includes five 1-millisecond subframes, and includes a downlink subframe, a special subframe, and an uplink subframe. The special subframe includes a downlink pilot timeslot DwPTS, an uplink pilot timeslot UpPTS, and a guard period GP. That is, the second-mode frame format includes 10 subframes, a length of each subframe is 1 millisecond, and a spacing between subcarriers in physical resource information corresponding to the second-mode frame format is 15 kHz.

For example, the downlink control information DCI includes scheduling information used to instruct a terminal to send uplink data, and includes at least one of a quantity of subcarriers used in a frequency domain, a used modulation and coding scheme or modulation scheme, or a quantity of bits included in a carried transport block.

It should be noted that when the communications system is the TDD system, for a specific second-mode frame format, refer to a related technology. Details are not described in this embodiment of the present invention.

Step 303. A terminal receives the downlink control information DCI sent by the base station, and sends uplink data according to the downlink control information.

Specifically, when the terminal is the first-type terminal, the DCI includes the scheduling information used to instruct the first-type terminal to send the uplink data by using the first-mode frame format. After receiving the DCI, the first-type terminal sends the uplink data in the first-mode frame format to the base station. When the terminal is the second-type terminal or the third-type terminal, the DCI includes the scheduling information used to instruct the second-type terminal or the third-type terminal to send the uplink data by using the second-mode frame format. After receiving the scheduling information, the second-type terminal or the third-type 3 terminal sends the uplink data in the second-mode frame format to the base station.

It should be noted that when the terminal is the second-type terminal or the third-type terminal, the scheduling information includes physical resource information corresponding to the second-mode frame format. The physical resource information includes a time resource and a frequency resource. The time resource includes at least one uplink subframe. The frequency resource includes one subcarrier, and a subcarrier spacing is 15 kHz.

The time resource in the physical resource information included in the scheduling information may be referred to as a scheduling length. A minimum scheduling length is a length of an uplink subframe in one second-mode frame format. An actual scheduling length may be subject to a distance between a base station and a terminal, or a coverage requirement that a terminal needs to meet in a cell. The base station may support at least one scheduling length. For example, for a scheduling length D1, among ND1 consecutive uplink subframes, maximum coverage of LD1 uplink subframes is supported in a cell; for a scheduling length D2, among ND2 consecutive uplink subframes, maximum coverage of LD2 uplink subframes is supported in a cell, and so on. A coverage area of the LD2 uplink subframes is greater than or equal to that of the LD1 uplink subframes, ND1 and ND2 are positive integers, and ND2 is greater than or equal to ND1 and may be preset. This is not specifically limited in this embodiment of the present invention. In addition, for each scheduling length, when the terminal is the second-type terminal, the frequency resource in the physical resource information included in the scheduling information includes one subcarrier. When the terminal is the third-type terminal, the frequency resource in the physical resource information included in the scheduling information includes at least one subcarrier (12 subcarriers at maximum).

Optionally, after step 303, the method further includes the following step:

Step 304. The terminal sends uplink control information or random access information to the base station.

Specifically, when the terminal is the first-type terminal, a frame format used for the uplink control information or the random access information is the first-mode frame format. The first-mode frame format includes at least one uplink subframe, and each uplink subframe includes at least one first-mode frame format symbol. Duration of the first-mode frame format symbol is at least four times of duration of a second-mode frame format symbol. The second-mode frame format symbol is a single carrier frequency division multiple access SC-FDMA symbol in the LTE system.

It should be noted that the uplink control information UCI includes an ACK or a NACK, so as to confirm whether the terminal correctly receives downlink data carried on a downlink shared channel PDSCH; or includes channel state information CSI used to reflect downlink channel quality. The uplink control information is carried on a physical uplink control channel PUCCH, or carried on a physical channel that is used to send the uplink control information and that is defined for the first-type terminal. The random access information includes a random access preamble, and is carried on a physical random access channel PRACH, or carried on a physical channel that is used to send uplink random access information and that is defined for the first-type terminal.

When the terminal is the second-type terminal or the third-type terminal, a frame format used for the uplink control information or the random access information is the second-mode frame format. The second-mode frame format includes the frame structure type 1 applicable to the FDD system and the frame structure type 2 applicable to the TDD system. The second-mode frame format includes 10 subframes, a length of each subframe is 1 millisecond, and a spacing between subcarriers in physical resource information corresponding to the second-mode frame format is 15 kHz.

It should be noted that when the terminal sends the uplink control information or the random access information to the base station, a frame format of the uplink control information or the random access information sent by the terminal may be the first-mode frame format or the second-mode frame format, and the first-mode frame format and the second-mode frame format not only can be obtained from the downlink control information DCI sent by the base station, but also can be preset. After the setting, the first-type terminal may directly use the first-mode frame format to send the uplink control information or the random access information, or the second-type terminal or the third-type terminal may directly use the second-mode frame format to send the uplink control information or the random access information. This is not limited in this embodiment of the present invention.

For example, the first-mode frame format is preset. That is, the first-mode frame format is correspondingly used at one or several specified carrier frequencies used in the communications system, or the first-mode frame format is correspondingly used for a specified downlink synchronization signal sequence or a specified format for sending a downlink synchronization signal, that is, at a specific time and/or frequency resource mapping location, or the first-mode frame format is correspondingly used for a format that is used for sending downlink system information and that is included or specified in the downlink system information, that is, at a specific time and/or frequency resource mapping location. The terminal may directly send the uplink control information or the random access information that uses a first frame format to the base station after learning, according to the specified correspondence or indication information in the downlink system information, that the first-mode frame format is used.

According to the scheduling method provided in this embodiment of the present invention, the base station sends the downlink control information DCI to the first-type terminal. The DCI includes the scheduling information used to instruct the first-type terminal to send the uplink data by using the first-mode frame format, the first-mode frame format includes the at least one uplink subframe, each uplink subframe includes the at least one first-mode frame format symbol, and the duration of the first-mode frame format symbol is at least four times of duration of the second-mode frame format symbol. The second-mode frame format symbol is the SC-FDMA symbol in the LTE system. The base station sends the downlink control information DCI to the second-type terminal or the third-type terminal. The DCI includes the scheduling information used to instruct the second-type terminal or the third-type terminal to send the uplink data by using the second-mode frame format. In this way, the base station in the LTE system can support an existing LTE terminal, and also support the first-type terminal, the second-type terminal, and the third-type terminal that are newly available in the TDD system. This saves a time resource, and also improves utilization of the base station.

Figure 20:
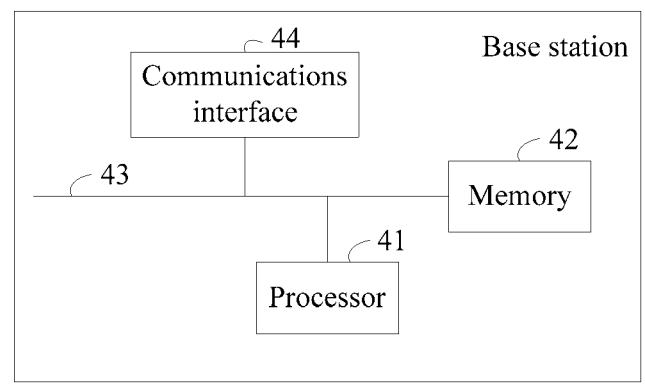
FIG. 20 is a schematic structural diagram of a base station according to an embodiment of the present invention.

FIG. 20 shows a base station according to an embodiment of the present invention. The base station includes a processor 41, a memory 42, a system bus 43, and a communications interface 44.

Persons of ordinary skill in the art can understand that a structure shown in FIG. 20 is merely an example, and is not construed as a limitation on the structure of the base station. For example, the base station may further include more or fewer components than those shown in FIG. 20, or may have a configuration different from that shown in FIG. 20.

The following describes each constituent component of the base station in detail.

The memory 42 is configured to store a computer executable instruction, the processor 42 is connected to the memory 42 by using the system bus 43, and when the base station runs, the processor 41 executes the computer executable instruction stored in the memory 42, so that the base station executes the steps performed by the base station in the method shown in FIG. 2 or FIG. 8. For a specific method, refer to related descriptions in the embodiment shown in either FIG. 2 or FIG. 8. Details are not described herein again.

This embodiment further provides a storage medium. The storage medium may include the memory 42.

The processor 41 may be a CPU. Alternatively, the processor 41 may be another general purpose processor, a DSP, an ASIC, an FPGA or another programmable logic device, a discrete gate or transistor logic device, a discrete hardware assembly, or the like. The general purpose processor may be a microprocessor, or the processor may be any conventional processor or the like.

The processor 41 may be a dedicated processor. The dedicated processor may include at least one of a baseband processing chip, a radio frequency processing chip, or the like. Further, the dedicated processor may further include a chip having another dedicated processing function of the base station.

The memory 42 may include a volatile memory, for example, a random access memory RAM; or the memory 42 may include a non-volatile memory, for example, a read-only memory ROM, a flash memory, an HDD, or an SSD; or the memory 42 may include a combination of the foregoing types of memories.

The system bus 43 may include a data bus, a power bus, a control bus, a signal status bus, and the like. For clear description in this embodiment, various buses in FIG. 20 are marked as the system bus 43.

The communications interface 44 may be specifically a transceiver on the base station. The transceiver may be a radio transceiver. For example, the radio transceiver may be an antenna or the like of the base station. The processor 41 receives data from or sends data to another device such as a terminal by using the communications interface 44.

In a specific implementation process, the steps performed by the base station in the method process shown in either FIG. 2 or FIG. 8 may be implemented by executing, by the processor 41 in a hardware form, the computer executable instruction stored in the memory 42 in a software form. To avoid repetition, no details are repeated herein.

According to the base station provided in this embodiment of the present invention, the base station sends downlink control information DCI to a first-type terminal. The DCI includes scheduling information used to instruct the first-type terminal to send uplink data by using a first-mode frame format, the first-mode frame format includes at least one uplink subframe, each uplink subframe includes at least one first-mode frame format symbol, and duration of the first-mode frame format symbol is at least four times of duration of a second-mode frame format symbol. The second-mode frame format symbol is an SC-FDMA symbol in an LTE system. The base station sends downlink control information DCI to a second-type terminal or a third-type terminal. The DCI includes scheduling information used to instruct the second-type terminal or the third-type terminal to send uplink data by using a second-mode frame format. In this way, the LTE system can support an existing LTE terminal, and also support the first-type terminal, the second-type terminal, and the third-type terminal that are newly available in an FDD system and a TDD system. This saves a time resource, and also improves utilization of a communications system and utilization of the base station.

Figure 21:
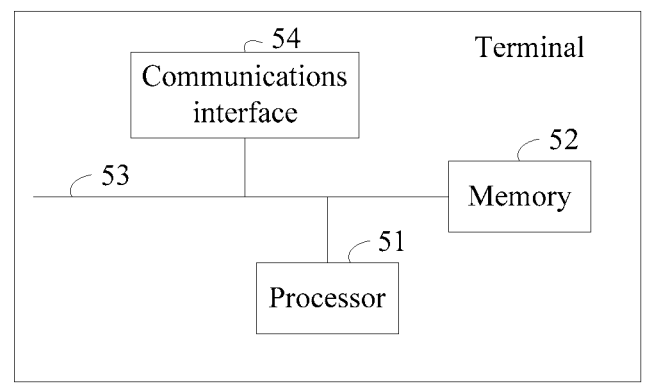
FIG. 21 is a schematic structural diagram of a terminal according to an embodiment of the present invention.

FIG. 21 shows a terminal according to an embodiment of the present invention. The terminal includes a processor 51, a memory 52, a system bus 53, and a communications interface 54.

Persons of ordinary skill in the art can understand that a structure shown in FIG. 21 is merely an example, and is not construed as limitation on the structure of the terminal. For example, the terminal may further include more or fewer components than those shown in FIG. 21, or may have a configuration different from that shown in FIG. 21.

The following describes each constituent part of the terminal in detail.

The memory 52 is configured to store a computer executable instruction, the processor 51 is connected to the memory 52 by using the system bus 53, and when the terminal runs, the processor 51 executes the computer executable instruction stored in the memory 52, so that the terminal executes the steps performed by the terminal in the method process shown in either FIG. 2 or FIG. 8. For a specific method, refer to related descriptions in the embodiment shown in either FIG. 2 or FIG. 8. No details are repeated herein.

This embodiment further provides a storage medium. The storage medium may include the memory 52.

The processor 51 may be a central processing unit (CPU). Alternatively, the processor 51 may be another general purpose processor, a digital signal processor (DSP), an application-specific integrated circuit (ASIC), a field-programmable gate array (FPGA) or another programmable logic device, a discrete gate or a transistor logic device, a discrete hardware assembly, or the like. The general purpose processor may be a microprocessor, or the processor may be any conventional processor or the like.

The processor 51 may be a dedicated processor. The dedicated processor may include at least one of a baseband processing chip, a radio frequency processing chip, or the like. Further, the dedicated processor may further include a chip having another dedicated processing function of the terminal.

The memory 52 may include a volatile memory, such as a random access memory (RAM); or the memory 52 may include a non-volatile memory, such as a read-only memory (ROM), a flash memory, a hard disk drive (HDD), or a solid-state drive (SSD); or the memory 52 may include a combination of the foregoing types of memories.

The system bus 53 may include a data bus, a power bus, a control bus, a signal status bus, and the like. For clear description in this embodiment, various buses in FIG. 21 are marked as the system bus 53.

The communications interface 54 may be specifically a transceiver on the terminal. The transceiver may be a radio transceiver. For example, the radio transceiver may be an antenna or the like of the terminal. The processor 51 receives data from or sends data to another device such as a base station by using the communications interface 54.

In a specific implementation process, the steps performed by the terminal in the method process shown in either FIG.

2 or FIG. 8 may be implemented by executing, by the processor 51 in a hardware form, the computer executable instruction stored in the memory 52 in a software form. To avoid repetition, details are not described herein again.

According to the terminal in this embodiment of the present invention, the terminal receives downlink control information DCI sent by a base station. When the terminal is a first-type terminal, the DCI includes scheduling information used to instruct the first-type terminal to send uplink data by using a first-mode frame format. The first-mode frame format includes at least one uplink subframe, each uplink subframe includes at least one first-mode frame format symbol, and duration of the first-mode frame format symbol is at least four times of duration of a second-mode frame format symbol. The second-mode frame format symbol is an SC-FDMA symbol in an LTE system. When the terminal is a second-type terminal or a third-type terminal, the DCI includes scheduling information used to instruct the second-type terminal or the third-type terminal to send uplink data by using a second-mode frame format. In this way, the LTE system can support an existing LTE terminal, and also support the first-type terminal, the second-type terminal, and the third-type terminal that are newly available in an FDD system and a TDD system. This saves a time resource, and also improves utilization of a communications system.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A communication method, applied to a communication system, the method comprising:
    sending, by a base station, downlink control information (DCI) to a terminal device, wherein the DCI comprises scheduling information used to instruct the terminal device to send uplink data by using a first mode frame format; and
    receiving, by the base station, uplink control information (UCI) or random access information, wherein the UCI is sent by the terminal device using the first mode frame format, or the random access information is sent by the terminal device using the first mode frame format, wherein when the communications system is time division duplex (TDD) system, a 10-millisecond period is used for a downlink-to-uplink switch point in the first mode frame format, wherein one downlink subframe, one special subframe, and at least one uplink subframe are comprised within a time length of the first 5 milliseconds, and only a downlink subframe is comprised within a time length of the last 5 milliseconds; and duration of each downlink subframe is 1 millisecond.

2. The method according to claim 1, wherein the UCI comprises an acknowledgement (ACK) or a negative acknowledgement (NACK), and the ACK or the NACK is used to confirm whether the terminal device correctly received the downlink data carried on a physical downlink shared channel (PDSCH).

3. The method according to claim 1, wherein the UCI is carried on a physical channel that is used to send uplink random access information which is defined for the terminal device.

4. The method according to claim 1, further comprising:
    sending, by the base station, downlink system information, wherein the downlink system information is used to instruct the first mode frame format.

5. The method according to claim 1,
    when the TDD system uses a normal cyclic prefix (CP) in uplink, and duration of the uplink subframe is 2 milliseconds, the uplink subframe comprises seven first mode frame format symbols, and duration of the seven first mode frame format symbols is equal to duration of 28 second mode frame format symbols and equal to 2 milliseconds, wherein duration of the second mode frame format symbol is duration of each single carrier frequency division multiple access (SC-FDMA) symbol that comprises the normal CP.

6. A communication method, applied to a communication system, the method comprising:
    receiving, by a terminal device, downlink control information (DCI), wherein the DCI comprises scheduling information used to instruct the terminal device to send uplink data by using a first mode frame format; and
    sending, by the terminal device, uplink control information (UCI) using the first mode frame format or random access information using the first mode frame format, wherein when the communications system is a time division duplex (TDD) system, a 10-millisecond period is used for a downlink-to-uplink switch point in the first mode frame format, wherein one downlink subframe, one special subframe, and at least one uplink subframe are comprised within a time length of the first 5 milliseconds, and only a downlink subframe is comprised within a time length of the last 5 milliseconds; and duration of each downlink subframe is 1 millisecond.

7. The method according to claim 6, wherein the UCI comprises an acknowledgement (ACK) or a negative acknowledgement (NACK), and the ACK or the NACK is used to confirm whether the terminal device correctly receives downlink data carried on a physical downlink shared channel (PDSCH).

8. The method according to claim 6, wherein the UCI is carried on a physical channel that is used to send uplink random access information which is defined for the terminal device.

9. The method according to claim 6, further comprising:
    receiving, by the terminal device, downlink system information, wherein the downlink system information is used to instruct the first mode frame format.

10. The method according to claim 6,
    when the TDD system uses a normal cyclic prefix (CP) in uplink, and duration of the uplink subframe is 2 milliseconds, the uplink subframe comprises seven first mode frame format symbols, and duration of the seven first mode frame format symbols is equal to duration of 28 second mode frame format symbols and equal to 2 milliseconds, wherein duration of the second mode frame format symbol is duration of each single carrier frequency division multiple access (SC-FDMA) symbol that comprises the normal CP.

11. A communication apparatus, the apparatus comprising:
    a non-transitory memory, configured to store a computer executable instruction;

a transmitter, configured to send downlink control information (DCI) to a terminal device, wherein the DCI comprises scheduling information used to instruct the terminal device to send uplink data by using a first mode frame format; and a receiver, configured to receive uplink control information (UCI) or random access information, wherein the UCI sent by the terminal device using the first mode frame format, or the random access information sent by the terminal device using the first mode frame format wherein when the communications system is a time division duplex (TDD) system, a 10-millisecond period is used for a downlink-to-uplink switch point in the first mode frame format, wherein one downlink subframe, one special subframe, and at least one uplink subframe are comprised within a time length of the first 5 milliseconds, and only a downlink subframe is comprised within a time length of the last 5 milliseconds; and duration of each downlink subframe is 1 millisecond.

12. The apparatus according to claim 11, wherein the UCI comprises an acknowledgement (ACK) or a negative acknowledgement (NACK), and the ACK or the NACK is used to confirm whether the terminal device correctly receives downlink data carried on a physical downlink shared channel (PDSCH).

13. The apparatus according to claim 11, wherein the UCI is carried on a physical channel that is used to send uplink random access information which is defined for the terminal device.

14. The apparatus according to claim 11, wherein the transmitter is further configured to send downlink system information, wherein the downlink system information is used to instruct the first mode frame format.

15. The apparatus according to claim 11,
when the TDD system uses a normal cyclic prefix (CP) in uplink, and duration of the uplink subframe is 2 milliseconds, the uplink subframe comprises seven first mode frame format symbols, and duration of the seven first mode frame format symbols is equal to duration of 28 second mode frame format symbols and equal to 2 milliseconds, wherein duration of the second mode frame format symbol is duration of each single carrier frequency division multiple access (SC-FDMA) symbol that comprises the normal CP.

16. A communication apparatus comprising:
a non-transitory memory, configured to store a computer executable instruction;
a receiver, configured to receive downlink control information (DCI), wherein the DCI comprises scheduling information used to instruct the terminal device to send uplink data by using a first mode frame format; and
a transmitter, configured to send uplink control information (UCI) using the first mode frame format or random access information using the first mode frame format, wherein when the communications system is a time division duplex (TDD) system, a 10-millisecond period is used for a downlink-to-uplink switch point in the first mode frame format, wherein one downlink subframe, one special subframe, and at least one uplink subframe are comprised within a time length of the first 5 milliseconds, and only a downlink subframe is comprised within a time length of the last 5 milliseconds; and duration of each downlink subframe is 1 millisecond.

17. The apparatus according to claim 16, wherein the UCI comprises an acknowledgement (ACK) or a negative acknowledgement (NACK), and the ACK or the NACK is used to confirm whether the terminal device correctly receives downlink data carried on a physical downlink shared channel (PDSCH).

18. The apparatus according to claim 16, wherein the UCI is carried on a physical channel that is used to send uplink random access information which is defined for the terminal device.

19. The apparatus according to claim 16, wherein the receiver is configured to receive downlink system information, wherein the downlink system information is used to instruct the first mode frame format.

20. The apparatus according to claim 16,
when the TDD system uses a normal cyclic prefix (CP) in uplink, and duration of the uplink subframe is 2 milliseconds, the uplink subframe comprises seven first mode frame format symbols, and duration of the seven first mode frame format symbols is equal to duration of 28 second mode frame format symbols and equal to 2 milliseconds, wherein duration of the second mode frame format symbol is duration of each single carrier frequency division multiple access (SC-FDMA) symbol that comprises the normal CP.

* * * * *